US011981008B2

(12) United States Patent
Kikai et al.

(10) Patent No.: US 11,981,008 B2
(45) Date of Patent: May 14, 2024

(54) STAPLE

(71) Applicant: MAX CO., LTD., Tokyo (JP)

(72) Inventors: Tomoaki Kikai, Tokyo (JP); Tomokazu Nagata, Tokyo (JP); Akira Aoki, Tokyo (JP)

(73) Assignee: Max Co., Ltd., Tokyo (JP)

(*) Notice: Subject to any disclaimer, the term of this patent is extended or adjusted under 35 U.S.C. 154(b) by 263 days.

(21) Appl. No.: 17/423,782

(22) PCT Filed: Jan. 10, 2020

(86) PCT No.: PCT/JP2020/000686

§ 371 (c)(1),
(2) Date: Jul. 16, 2021

(87) PCT Pub. No.: WO2020/149235

PCT Pub. Date: Jul. 23, 2020

(65) Prior Publication Data

US 2022/0111503 A1 Apr. 14, 2022

(30) Foreign Application Priority Data

Jan. 17, 2019 (JP) ................................ 2019-005955
Jan. 17, 2019 (JP) ................................ 2019-005956

(51) Int. Cl.
*B25C 5/02* (2006.01)
*B25C 5/11* (2006.01)

(52) U.S. Cl.
CPC .............. *B25C 5/0285* (2013.01); *B25C 5/11* (2013.01)

(58) Field of Classification Search
CPC ..... B25C 5/0285; B25C 5/025; B25C 5/0242; B25C 5/0207; B25C 5/11
See application file for complete search history.

(56) References Cited

U.S. PATENT DOCUMENTS

| | | | |
|---|---|---|---|
| 6,062,457 | A | 5/2000 | Huang |
| 6,966,479 | B2 | 11/2005 | Tanaka et al. |

(Continued)

FOREIGN PATENT DOCUMENTS

| | | | |
|---|---|---|---|
| CN | 101480893 | A | 7/2009 |
| CN | 102848353 | A | 1/2013 |

(Continued)

OTHER PUBLICATIONS

Extended European Search Report for European Application No. 20741634.8 dated Jan. 16, 2023. (pp. 1-15).

(Continued)

*Primary Examiner* — Veronica Martin
(74) *Attorney, Agent, or Firm* — Banner & Witcoff, Ltd.

(57) ABSTRACT

A stapler includes a handle unit connected to a driver unit by a transmission shaft portion provided between a fulcrum shaft portion and a driver, and configured to move the driver unit; a camshaft provided to a clincher unit; a cam groove portion provided to the handle unit, configured to permit the camshaft to enter, and having one open end portion to enable to the camshaft to be inserted/pulled out; a guide convex portion provided to the clincher unit, and a guide concave portion provided to the handle unit and configured to restrict a movement path of the handle unit with respect to the clincher unit.

7 Claims, 28 Drawing Sheets

(56) References Cited

U.S. PATENT DOCUMENTS

| | | | | |
|---|---|---|---|---|
| 2002/0005427 | A1* | 1/2002 | Aoki | B25C 5/025 227/134 |
| 2013/0001269 | A1 | 1/2013 | Aoki et al. | |
| 2013/0284787 | A1 | 10/2013 | Aoki et al. | |
| 2017/0203426 | A1* | 7/2017 | Yu | B25C 5/025 |

FOREIGN PATENT DOCUMENTS

| | | | |
|---|---|---|---|
| CN | 203156700 | U | 8/2013 |
| CN | 206519941 | U | 9/2017 |
| EP | 1366862 | A1 | 12/2003 |
| JP | 2002-028877 | A | 1/2002 |
| JP | 2002-264035 | A | 9/2002 |
| JP | 2005144648 | A | 6/2005 |
| JP | 2008-168401 | A | 7/2008 |
| JP | 2013-230517 | A | 11/2013 |
| JP | 2018-122419 | A | 8/2018 |
| TW | 200927398 | A | 7/2009 |
| TW | 201806709 | A | 3/2018 |
| WO | 2017/183731 | A1 | 10/2017 |

OTHER PUBLICATIONS

Japanese Office Action dated Aug. 30, 2022, issued by the Japanese Patent Office in the corresponding Japanese Patent Application No. 2019-005956. (with English machine translation) (5 pages).

Indian Search Report dated Jan. 9, 2023, issued by the Indian Patent Office in the corresponding Indian Patent Application No. 202117032159. (7 pages).

International Search Report and Written Opinion issued in Application No. PCT/JP2020/000686 dated Mar. 24, 2020, 9 pages.

Indian Office Action dated Jan. 9, 2023, issued by the Indian Patent Office in the corresponding Indian Patent Application No. 202117032159. (7 pages).

Dec. 7, 2023—(CN) First Office Action—App 202080009620.5.

* cited by examiner

STAPLE

This application is a 35 U.S.C. 371 National Phase Entry Application from PCT/JP2020/000686, filed Jan. 10, 2020, which claims priority to Japanese Patent Application Nos. 2019-005955, filed Jan. 17, 2019, and 2019-005956, filed Jan. 17, 2019, the disclosures of which are incorporated herein in their entirety by reference, and priority is claimed to each of the foregoing.

TECHNICAL FIELD

The present invention relates to a stapler.

BACKGROUND ART

As for a stapler configured to bind a sheet bundle, suggested is a technology having a so-called boosting mechanism so as to reduce a required load (for example, refer to PTL 1). In a configuration of the boosting mechanism of the related art, a rate of decrease in load (boosting rate) is kept constant over an entire stroke of a handle. For this reason, an operating amount of the handle increases and a size of the device in a height direction increases.

In contrast, suggested is a stapler having a so-called variable boosting mechanism configured to enable a rate of decrease in load to vary, according to a load required for an operation, thereby suppressing an increase in operating amount of a handle (for example, refer to PTL 2).

In addition, a stapler configured to bind a sheet bundle by causing a pair of leg portions of a staple to penetrate through a sheet bundle and inwardly bending the leg portions is widely used (for example, refer to PTL 2). The stapler has, main constitutional components, a handle arm, a driver arm, a magazine, a clincher arm, and the like. The handle arm, the driver arm and the magazine are rotatably supported via a shaft portion by bearing parts provided to the clincher arm, for example.

In the stapler, grease, which is lubricant, may be applied to shaft holes of the bearing parts and the shaft portion so as to reduce the friction during rotation (sliding) between the shaft portion and the other components such as the handle arm and the like.

CITATION LIST

Patent Literature

[PTL 1] JP2002-28877A
[PTL 2] JP2013-230517A

SUMMARY OF INVENTION

Technical Problem

In the stapler having the variable boosting mechanism, since a shaft hole portion provided on the handle-side so as to change the boosting rate has a closed long hole shape and the shaft hole portion and the shaft are engaged in a state where the handle is in a standby position, a configuration where a magazine is opened by rotating the handle cannot be implemented. For this reason, a configuration of sliding the magazine toward the front of the staples is provided. As a result, the number of components increases, and the device increases in size.

In addition, the stapler having the variable boosting mechanism uses staples that are larger in size than staples called JIS No. 10 needle. On the other hand, it is desired a stapler that can use staples called JIS 10 needle to increase the number of staples to be accommodated and can be operated in the same manner as the conventional stapler.

When an amount of grease applied to the bearing part and the shaft portion is small or when the amount of applied grease is reduced as the stapler is repeatedly used, the friction (sliding resistance) between the shaft portion and another component increases, so that poor sliding may be caused. Even if it is tried to increase the amount of grease to be applied, since a diameter of the shaft hole of the bearing part and a diameter of the shaft portion are designed to be substantially the same in the stapler of the related art, the grease that can be applied to the bearing part is limited to a certain amount.

An object of the present invention is to provide a stapler where a variable boosting mechanism is provided, a magazine can be opened by rotating a handle and the number of staples called JIS No. 10 needle to be accommodated is increased.

Another object of the present invention is to provide a stapler capable of suppressing poor sliding with another component in a bearing part.

Solution to Problem

According to the present invention, provided is a stapler including: a clincher unit having a clincher part configured to bend leg portions of a staple and provided on one end portion-side; a magazine unit having a magazine in which a staple bundle consisting of staples connected to each other is loaded, and supported on the other end portion-side of the clincher unit to be rotatable about a fulcrum shaft portion as a fulcrum with respect to the clincher unit; a driver unit having a driver configured to strike out a staple from the magazine and provided on one end portion-side, the other end portion-side of the driver unit being supported to be rotatable about the fulcrum shaft portion as a fulcrum with respect to the clincher unit; a handle unit connected to the driver unit by a transmission shaft portion provided between the fulcrum shaft portion and the driver, and configured to move the driver unit toward the clincher unit for opening and closing; a camshaft portion provided to any one of the clincher unit and the handle unit; a cam groove portion provided to the other of the clincher unit and the handle unit, configured to permit the camshaft portion to enter, and having one open end portion in a direction, in which the clincher unit and the handle unit separate from each other, to enable the camshaft portion to be inserted/pulled out; and a guide portion configured to restrict a movement path of the handle unit with respect to the clincher unit in operations of opening and closing the handle unit and the driver unit with respect to the clincher unit and the magazine unit.

The cam groove portion configured to change a boosting rate has one open end portion in the direction in which the clincher unit and the handle unit separate from each other. Therefore, in operations of opening and closing the handle unit with respect to the clincher unit, the camshaft portion can be inserted/pulled out with respect to the cam groove portion. In addition, in operations of opening and closing the handle unit and the driver unit with respect to the clincher unit and the magazine, the movement path of the handle unit with respect to the clincher unit is restricted, and in an operation of closing the handle unit, the cam groove portion can be guided to the camshaft portion.

In addition, provided is a stapler including: a clincher unit having a clincher part configured to bend leg portions of a staple and provided on one end portion-side; a magazine unit having a magazine in which a staple bundle consisting of staples connected to each other is loaded, and supported on the other end portion-side of the clincher unit to be rotatable about a fulcrum shaft portion as a fulcrum with respect to the clincher unit; a driver unit having a driver configured to strike out a staple from the magazine and provided on one end portion-side, the other end portion-side of the driver unit being supported to be rotatable about the fulcrum shaft portion as a fulcrum with respect to the clincher unit; and a handle unit connected to the driver unit by a transmission shaft portion provided between the fulcrum shaft portion and the driver, and configured to move the driver unit toward the clincher unit for opening and closing; wherein the magazine unit has a pusher provided to be movable along a length direction of the magazine, a pusher spring for pressing the pusher toward a magazine front wall part of the magazine, and a pusher band having one end portion attached to the pusher and the other end portion attached to the driver unit, and configured to connect the pusher and the driver unit, and wherein in a state where the pusher is retreated by the pusher band and is moved to a most retreat position in an operation of opening the handle unit and the driver unit with respect to the clincher unit and the magazine unit, a length between an inner surface-side of the magazine front wall part and the pusher is 75 mm or longer, a length of the magazine is 90 mm or longer and 100 mm or shorter, a length of the pusher band is 51 mm or longer and 61 mm or shorter, a length from the fulcrum shaft portion to an attachment position of the pusher band to the driver unit is 41 mm or longer and 50 mm or shorter, and an entire length of the stapler is 105 mm or longer and 125 mm or shorter.

A length of a staple bundle where staples called JIS No. 10 needle are connected is about 25 mm, and three staple bundles can be loaded in the magazine.

Advantageous Effects of Invention

In the stapler having a variable boosting mechanism, the staple bundle can be loaded by opening the magazine in a similar operation to the stapler of the related art for rotating a handle.

In the stapler large enough to be held and operated with a hand, the three staple bundles consisting of connected staples of JIS No. 10 needles can be loaded, so that it is possible to reduce the frequency to replace the staple bundle.

DESCRIPTION OF EMBODIMENTS

Hereinafter, a first embodiment of the present invention will be described in detail with reference to FIGS. 1 to 17.

<Configuration Example of Stapler>

Figure 1:
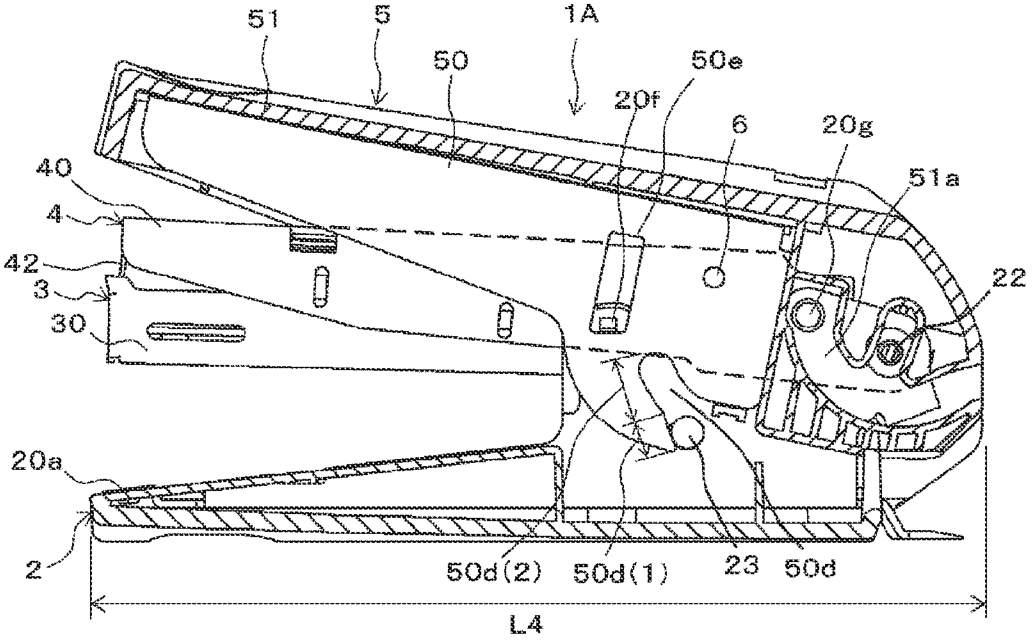
FIG. 1 is a sectional side view showing an example of a stapler according to a first embodiment of the present invention.
Figure 2:
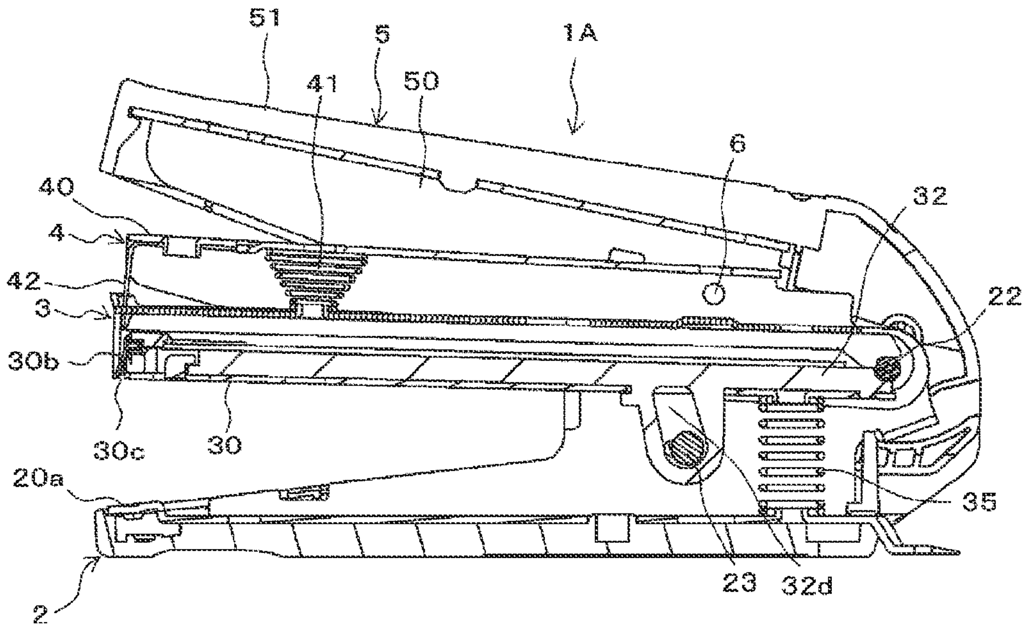
FIG. 2 is a sectional side view showing the example of the stapler.
Figure 3:
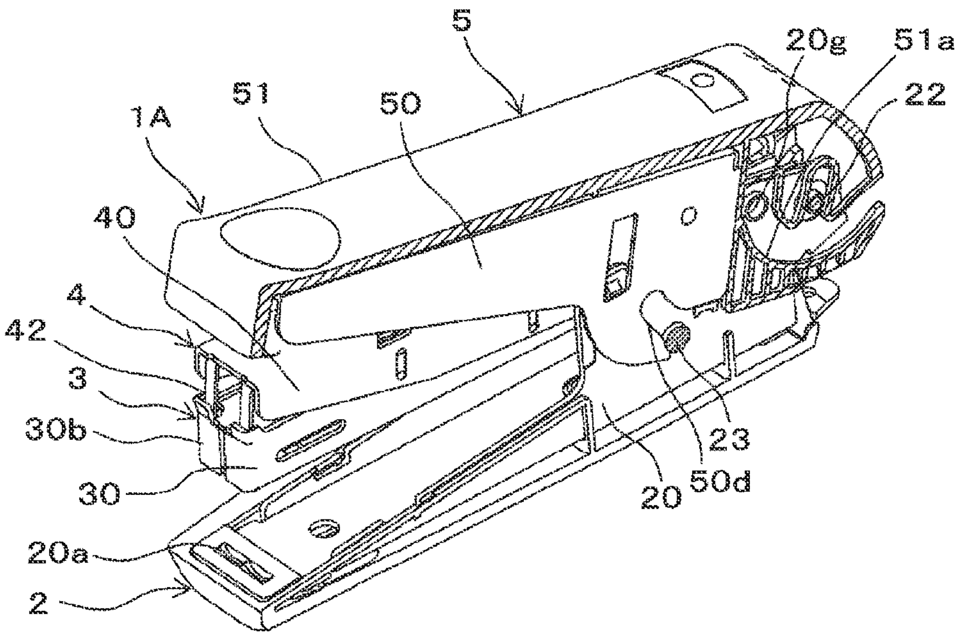
FIG. 3 is a sectional perspective view showing the example of the stapler.
Figure 4:
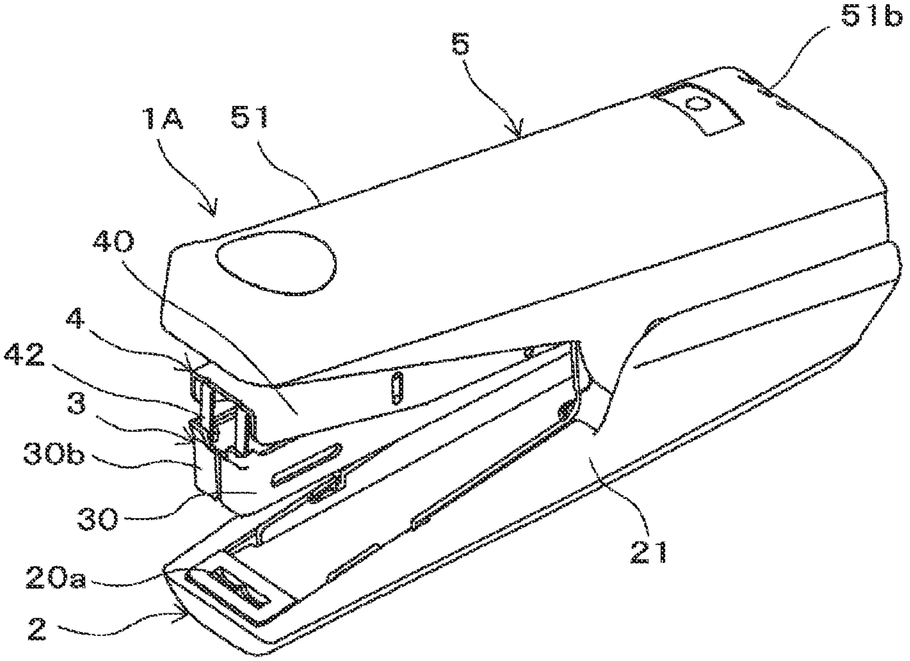
FIG. 4 is a perspective view showing the example of the stapler.
Figure 5:
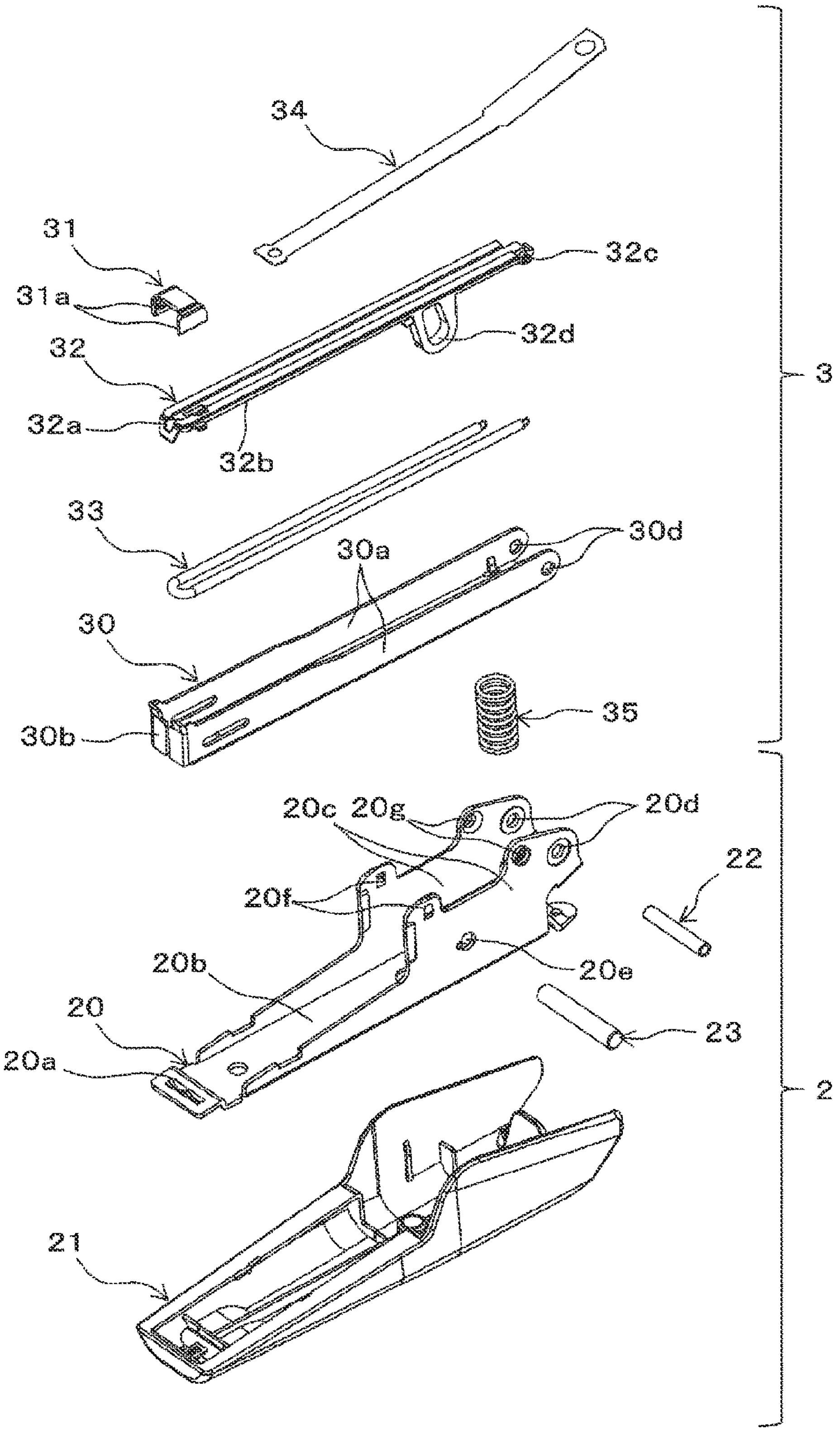
FIG. 5 is an exploded perspective view showing the example of the stapler.
Figure 6:
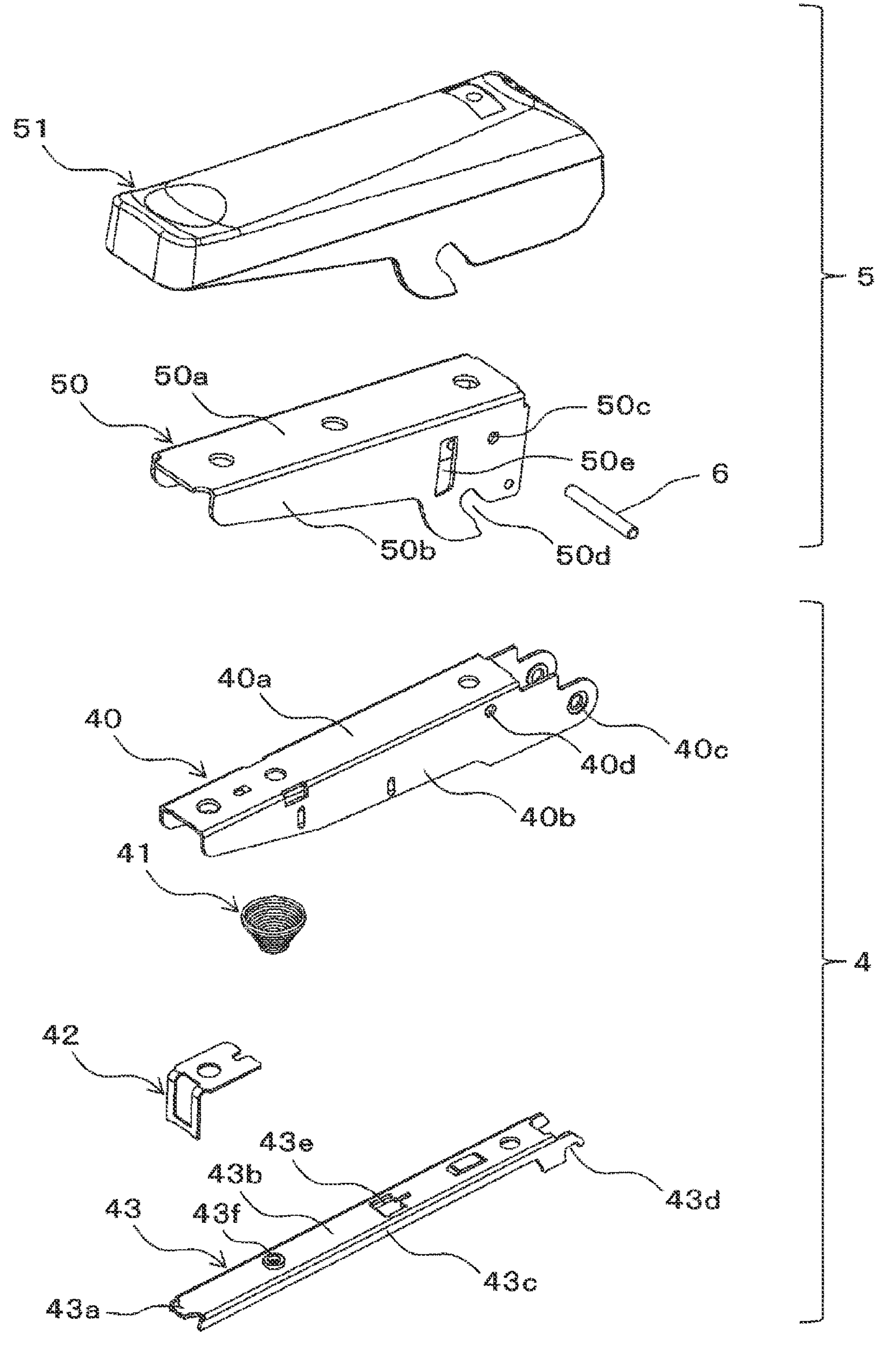
FIG. 6 is an exploded perspective view showing the example of the stapler.
Figure 7A:
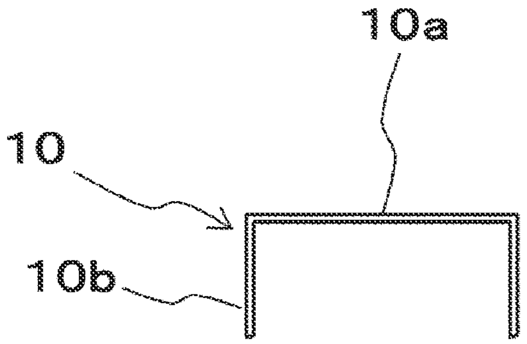
FIG. 7A is a front view showing an example of a staple that is used for the stapler.
Figure 7B:
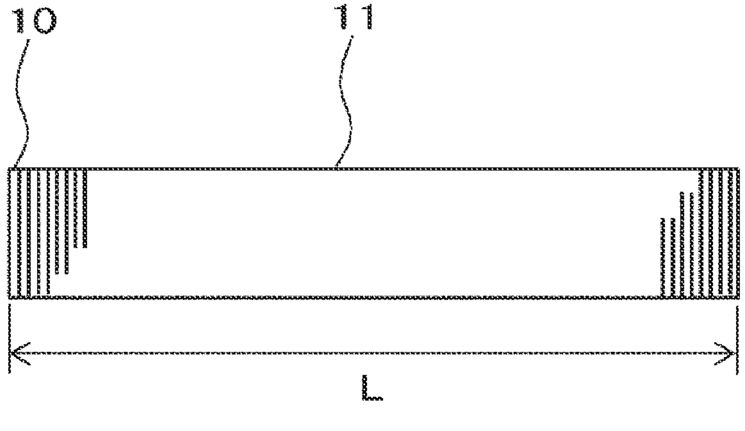
FIG. 7B is a side view showing an example of the staples that are used for the stapler.

FIGS. 1 and 2 are sectional side views showing an example of a stapler according to the present embodiment, FIG. 3 is a sectional perspective view showing the example of the stapler, FIG. 4 is a perspective view showing the example of the stapler, and FIGS. 5 and 6 are exploded perspective views showing the example of the stapler. FIG. 7A is a front view showing an example of a staple that is used for the stapler, and FIG. 7B is a side view showing an example of the staples that are used for the stapler.

First, a staple 10 is described with reference to FIGS. 7A and 7B. As shown in FIG. 7A, a staple 10 has a crown portion 10*a*, and two leg portions 10*b* obtained by bending both ends of the crown portion 10*a* to be substantially parallel to each other in one direction. A plurality of staples 10 is integrated by bonding, so that a staple bundle 11 as shown in FIG. 7B is obtained.

The staple 10 is of a standard called JIS No. 10 needle and has a thickness of about 0.5 mm, and the staple bundle 11 obtained by connecting a series of 50 standard staples has a length L of about 25 mm.

A stapler 1A, which will be described later, is a stapler that uses the staple 10 called JIS No. 10 needle and can be held and operated with a hand, has a boosting mechanism for reducing a load necessary for an operation of binding a sheet bundle, and further has a configuration called a variable boosting mechanism by which a rate of decrease in load is switched so that a load is adjusted according to the operation in each process of the operation of binding the sheet bundle.

The stapler 1A is a stapler having the variable boosting mechanism and a size that can be held and operated with a hand, and enabling staples to be loaded by opening and closing a handle unit.

The stapler 1A is also a stapler having the variable boosting mechanism and a size that can be held and operated with a hand, and enabling three staple bundles of JIS No. 10 needles to be loaded.

The stapler 1A includes a clincher unit 2, a magazine unit 3, a driver unit 4, and a handle unit 5.

The clincher unit 2 has a clincher arm 20, and a clincher arm cover 21 configured to cover the clincher arm 20.

The clincher arm 20 is formed into a predetermined shape by bending a plate-shaped metal material by, for example, punching and bending such as pressing. The clincher arm 20 has a clincher part 20*a* configured to bend the leg portions 10*b* of the staple 10 and provided on a bottom surface part 20*b* of a tip end-side, which is one end portion-side in an extension direction of the clincher arm 20. A groove portion of the clincher part 20*a* for bending the leg portions 10*b* of the staple 10 into a predetermined shape is formed integrally with the bottom surface part 20*b* of the clincher arm 20.

The clincher arm 20 has a pair of sidewall parts 20*c* formed by bending both side parts on a rear end-side, which is the other end portion-side in the extension direction of the clincher arm 20, in a substantially vertical direction with respect to the bottom surface part 20*b*.

The clincher arm 20 has fulcrum pin support portions 20*d* penetrating through the pair of sidewall parts 20*c*, in which a fulcrum pin 22 that is a fulcrum shaft portion is inserted, and provided on the other end portion-side. The fulcrum pin support portions 20*d* are formed as hole portions penetrating through the pair of sidewall parts 20*c*. The clincher arm 20 also has camshaft support portions 20*e* penetrating through the pair of sidewall parts 20*c*, in which a camshaft 23 that is a camshaft portion is inserted, and provided between the clincher part 20*a* and the fulcrum pin support portions 20*d*. The camshaft support portions 20*e* are formed as hole portions penetrating through the pair of sidewall parts 20*c*.

The clincher arm 20 also has restriction convex portions 20*f* configured to restrict the handle unit 5 from opening with respect to the clincher unit 2 and provided between the clincher part 20*a* and the camshaft support portions 20*e*. The restriction convex portions 20*f* are each constituted by providing a convex portion having a predetermined shape on an outer surface of each of the pair of sidewall parts 20*c*. The clincher arm 20 also has guide convex portions 20*g* configured to guide opening and closing of the handle unit 5 and provided between the fulcrum pin support portions 20*d* and the camshaft support portions 20*e*. The guide convex portions 20*g* are an example of the guide portion, and are each constituted by providing a convex portion having a circular column shape on the outer surface of each of the pair of sidewall parts 20*c*.

The clincher arm cover 21 is made of resin and has a shape covering the bottom surface part 20*b* and the pair of sidewall parts 20*c* of the clincher arm 20.

Figure 8A:
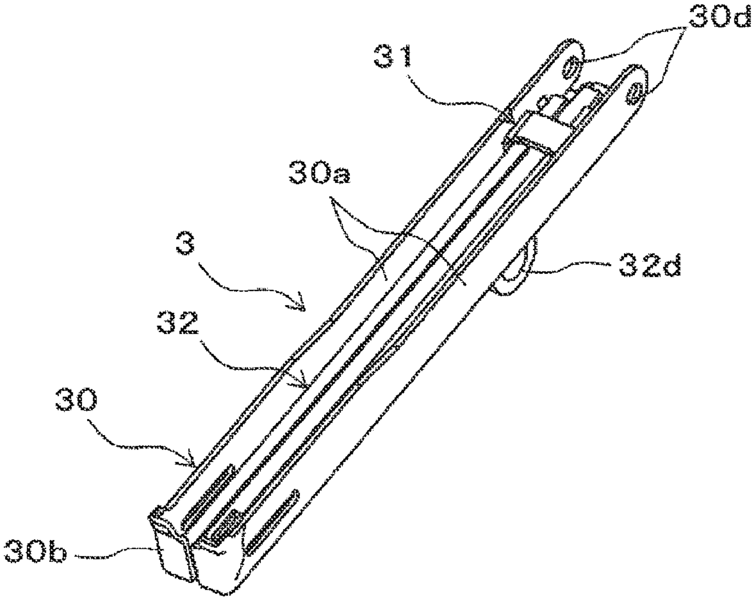
FIG. 8A is a perspective view showing an example of a magazine unit.
Figure 8B:
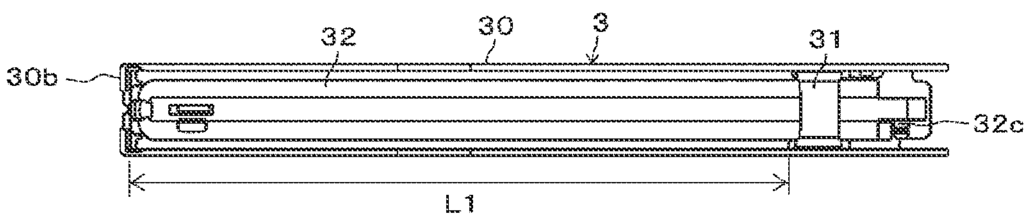
FIG. 8B is a plan view showing the example of the magazine unit.
Figure 8C:
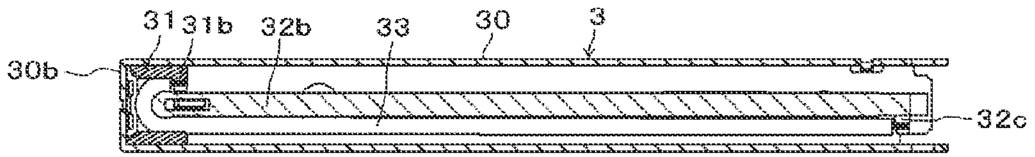
FIG. 8C is a sectional view showing the example of the magazine unit.
Figure 8D:
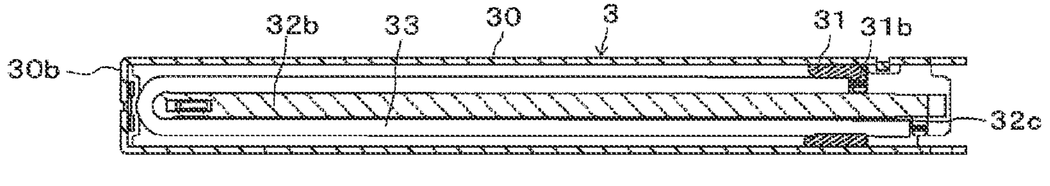
FIG. 8D is a sectional view showing the example of the magazine unit.

FIG. 8A is a perspective view showing an example of the magazine unit, FIG. 8B is a plan view showing the example of the magazine unit, and FIGS. 8C and 8D are sectional views showing the example of the magazine unit.

The magazine unit 3 has a magazine 30 in which the staples 10 are loaded, a pusher 31 configured to press the staples 10 loaded in the magazine 30 in a wire width direction orthogonal to the crown portion 10*a*, a pusher guide 32 configured to guide movement of the pusher 31, a pusher spring 33 for urging the pusher 31, a pusher band 34 configured to move the pusher 31 by opening and closing of the handle unit 5, and a magazine return spring 35 for urging the magazine unit 3 away from the clincher unit 2.

The magazine 30 is formed into a predetermined shape by bending a plate-shaped metal material by, for example, punching and bending such as pressing, and has a space which the staples 10 can be loaded therein and has an opened top surface. Specifically, the magazine 30 has a pair of magazine sidewall parts 30*a* formed by bending both side parts of the magazine bottom surface part in a substantially vertical direction toward one direction, and erected from both side parts of the magazine bottom surface part.

The magazine 30 is configured such that an inner width of the facing magazine sidewall parts 30*a* is substantially the same as an outer width of the crown portion 10*a* of the staple 10 to the extent that the staple bundle 11 can be inserted, the staples 10 can be loaded between the facing magazine sidewall parts 30*a* and positions of the loaded staples 10 in a width direction are restricted.

The magazine 30 has a magazine front wall part 30*b* formed by bending inwardly tip ends of the pair of magazine sidewall parts 30*a*, which are one end portions in a length direction of the magazine 30, in such an aspect of blocking tip ends of the facing magazine sidewall parts 30*a*, and a lower portion of the magazine front wall part 30*b* is provided with an opening portion 30*c* having a size through which the staple 10 separated into one piece can pass.

The magazine 30 has fulcrum pin support portions 30*d* penetrating through the pair of magazine sidewall parts 30*a*, in which the fulcrum pin 22 is inserted, and provided on a rear end-side, which is one end portion-side in the length direction of the magazine 30. The fulcrum pin support portions 30*d* are formed as hole portions penetrating through the pair of magazine sidewall parts 30*a*.

The pusher 31 is made of a resin material such as plastic, and has pressing portions 31*a* for pressing against the staple 10, a pusher spring engaging portion 31*b* to which the pusher spring 33 is engaged, and a band engaging portion (not shown) to which the pusher band 34 is engaged. The pressing portions 31*a* have such a shape of protruding forward from both left and right sides on a tip end-side of the pusher 31 facing the magazine front wall part 30*b*, and are configured to press against the two leg portions 10*b* of the staple 10. The pusher spring engaging portion 31*b* is constituted by providing an inner side of one side surface of the pusher 31 with a projection to which one end portion of the pusher spring 33 is hooked.

The pusher guide 32 is made of a resin material such as plastic, and extends in the length direction of the magazine 30. A width of the pusher guide 32 in the width direction is made smaller than an inner width of the crown portion 10*a* of the staple 10, so that a space in which the leg portions 10*b* of the staple 10 can be inserted is provided between the pusher guide 32 and the magazine sidewall parts 30*a*.

The pusher guide 32 has a staple guide portion 32*a* configured to press the staple 10 separated into one piece against the magazine front wall part 30*b*. The staple guide portion 32*a* has a width slightly smaller than the inner width of the crown portion 10*a* of the staple 10, and is provided integrally with the tip end-side of the pusher guide 32 with facing the magazine front wall part 30*b* of the magazine 30.

The pusher guide 32 has a pusher spring guide portion 32*b* configured to guide the pusher spring 33, and a pusher spring engaging portion 32*c* to which the pusher spring 33 is engaged. The pusher spring guide portion 32*b* is constituted by providing a bottom surface-side of the pusher guide 32 with a convex portion for folding the pusher spring 33 into a U-shape on the tip end-side of the pusher guide 32. The pusher spring engaging portion 32*c* is constituted by providing one inner surface of the rear end-side of the pusher guide 32 with a projection to which the other end portion of the pusher spring 33 is hooked.

The pusher guide 32 also has a restriction portion 32*d* configured to restrict the magazine unit 3 from opening with respect to the clincher unit 2. The restriction portion 32*d* is constituted by providing a convex portion, which protrudes from the magazine bottom surface part toward the clincher unit 2 when the pusher guide 32 is attached to the magazine 30, with a long hole which the camshaft 23 can be inserted therein and has a shape extending along the moving direction of the magazine unit 3 with respect to the clincher unit 2.

The pusher spring 33 is constituted by a tension coil spring. The pusher spring 33 is engaged at one end portion with the pusher spring engaging portion 31*b* of the pusher 31. The pusher spring 33 is folded into a U-shape at an intermediate portion by the pusher spring guide portion 32*b* on the tip end-side of the pusher guide 32. The pusher spring 33 is also engaged at the other end portion with the pusher spring engaging portion 32*c* of the pusher guide 32. Thereby, the pusher spring 33 is extended during an operation of moving the pusher 31 toward the rear end-side of the magazine 30, and the pusher 31 is pressed toward the tip end of the magazine 30 by the contraction force of the pusher spring 33.

The pusher band 34 is made of a tape-shaped resin material, and is attached at one end portion to the pusher 31.

The magazine return spring 35 is constituted by a compression coil spring, and is attached between the magazine unit 3 and the clincher unit 2.

In the magazine unit 3, the pusher 31 and the pusher spring 33 are incorporated to the pusher guide 32 as described above, and the pusher guide 32 having the pusher 31 and the pusher spring 33 incorporated thereto is attached to an inner side of the magazine 30.

In the magazine unit 3, movement of the pusher 31 is guided by the pusher guide 32. In a state where the pusher 31 is retreated due to an operation of loading or taking out the staple bundle 11 with respect to the magazine 30, the staples 10 loaded in the magazine 30 are guided by the pusher guide 32, and particularly, the staples 10 whose remaining number is small are prevented from falling down. In addition, the staple 10 that is separated into one piece and struck out is guided by the staple guide portion 32*a* of the pusher guide 32.

The fulcrum pin 22 inserted in the fulcrum pin support portions 20*d* of the clincher arm 20 is inserted into the fulcrum pin support portions 30*d* of the magazine 30, so that the magazine unit 3 is attached to the clincher unit 2. Also, the camshaft 23 inserted in the camshaft support portions 20*e* of the clincher arm 20 is inserted into the restriction portion 32*d* protruding from the magazine bottom surface part of the magazine 30. The magazine return spring 35 is attached with being compressed by a predetermined amount between the magazine bottom surface part of the magazine 30 and the bottom surface part 20*b* of the clincher arm 20.

Thereby, the magazine unit 3 can rotate about the fulcrum pin 22 as a fulcrum axis with respect to the clincher unit 2. When the magazine unit 3 rotates toward the clincher unit 2, the magazine return spring 35 is compressed. In an operation where the magazine unit 3 rotates away from the clincher unit 2 as the compressed magazine return spring 35 is restored, a rotatable range of the magazine unit 3 is restricted by the restriction portion 32*d* in which the camshaft 23 is inserted, and a predetermined space is secured between the magazine 30 and the clincher part 20*a*.

The driver unit 4 has a driver arm 40, the driver arm return spring 41, a driver 42, and a staple cover 43.

The driver arm 40 is formed into a predetermined shape by bending a plate-shaped metal material by, for example, punching and bending such as pressing. The driver arm 40 has a pair of sidewall parts 40*b* formed by bending both side parts of a top surface part 40*a* in a substantially vertical direction with respect to the top surface part 40*a*.

The driver 42 configured to separate the staples 10 loaded in the magazine 30 into one staple and to strike out the same is attached to the top surface part 40*a* on a tip end-side of the driver arm 40, which is one end portion-side in an extension direction of the driver arm 40. The driver 42 has substantially the same width as an outer width of the crown portion 10*a* of the staple 10, and has substantially the same plate thickness as the wire width of the staple 10.

The driver arm 40 also has fulcrum pin support portions 40*c* penetrating through the pair of sidewall parts 40*b*, in which the fulcrum pin 22 is inserted, and provided on a rear end-side that is the other end portion-side in the extension direction of the driver arm 40. The fulcrum pin support portions 40*c* are formed as hole portions penetrating through the pair of sidewall parts 40*b*.

The driver arm 40 also has boosting pin support portions 40*d*, in which a boosting pin 6 that is the transmission shaft portion is inserted, provided between the fulcrum pin support portions 40*c* and the driver 42. The boosting pin support portions 40*d* are formed as hole portions penetrating through the pair of sidewall parts 40*b*.

The staple cover 43 is formed into a predetermined shape by bending a plate-shaped metal material by, for example, punching and bending such as pressing. The staple cover 43 has a magazine/driver engaging portion 43*a* configured to engage with the driver 42 and the magazine front wall part

30*b* of the magazine 30 and provided on a top surface part 43*b* on a tip end-side, which is one end portion-side in an extension direction of the staple cover 43. The staple cover 43 also has a pair of sidewall parts 43*c* formed by bending both side parts of the top surface part 43*b* in a substantially vertical direction with respect to the top surface part 43*b*.

The staple cover 43 has fulcrum pin support portions 43*d* configured to support the fulcrum pin 22 and provided on a rear end-side that is the other end portion-side in the extension direction of the staple cover 43. The fulcrum pin support portions 43*d* are constituted by concave portions provided to the pair of sidewall parts 43*c*. The staple cover 43 also has an opening portion 43*e*, through which the pusher band 34 passes, provided between the magazine/driver engaging portion 43*a* and the fulcrum pin support portions 43*d*. The staple cover 43 also has a mounting portion 43*f* configured to engage with the pusher band 34 and the driver arm return spring 41 and provided between the magazine/driver engaging portion 43*a* and the opening portion 43*e*.

The driver arm return spring 41 is constituted by a compression coil spring and is engaged at one end portion with the mounting portion 43*f* provided on the top surface part 40*a* of the driver arm 40, so that it is attached between the top surface part 40*a* and the top surface part 43*b* of the staple cover 43.

The fulcrum pin 22 inserted in the fulcrum pin support portions 20*d* of the clincher arm 20 and the fulcrum pin support portions 30*d* of the magazine 30 is inserted into the fulcrum pin support portions 40*c* of the driver arm 40, so that the driver unit 4 is attached to the clincher unit 2. The magazine/driver engaging portion 43*a* of the staple cover 43 is engaged to the driver 42 and the fulcrum pin support portions 43*d* of the staple cover 43 are supported by the fulcrum pin 22. The driver arm return spring 41 is attached with being compressed by a predetermined amount between the top surface part 40*a* of the driver arm 40 and the top surface part 43*b* of the staple cover 43. Also, one end portion of the pusher band 34 is attached to the pusher 31, and the other end portion of the pusher band 34 is attached to the mounting portion 43*f* through the opening portion 43*e*.

Thereby, the driver unit 4 can rotate about the fulcrum pin 22 as a fulcrum axis with respect to the clincher unit 2 and the magazine unit 3. When the driver unit 4 rotates away from the magazine unit 3, the pusher band 34 pulls the pusher 31, so that the pusher 31 is guided by the pusher guide 32 and is moved to the rear end-side of the magazine 30. Thereby, a space in which the staples 10 can be loaded is formed between the inner surface-side of the magazine front wall part 30*b* and the pusher 31.

When the driver unit 4 rotates toward the magazine unit 3, the pusher 31 is moved toward the tip end-side of the magazine 30 by the pusher spring 33. In a case where the staples 10 are loaded in the magazine 30, the staples 10 are pressed against the magazine front wall part 30*b* by the pusher 31.

When the driver unit 4 rotates toward the magazine unit 3, the magazine/driver engaging portion 43*a* is engaged to the magazine front wall part 30*b* of the magazine 30. When the driver unit 4 further rotates toward the magazine unit 3, the driver 42 protrudes into the magazine 30 along the inner surface-side of the magazine front wall part 30*b* and the driver arm return spring 41 is compressed.

In the operation in which the driver unit 4 rotates away from the magazine unit 3 as the compressed driver arm return spring 41 is restored, the driver 42 is retreated from the magazine 30. A range of the drive 4 that can rotate as the compressed driver arm return spring 41 is restored is restricted as the driver 42 is engaged to the magazine/driver engaging portion 43*a*.

The handle unit 5 has a handle arm 50, and a handle arm cover 51. The handle arm 50 is formed into a predetermined shape by bending a plate-shaped metal material by, for example, punching and bending such as pressing.

The handle arm 50 has a pair of sidewall parts 50*b* formed by bending both side parts of a top surface part 50*a* in a substantially vertical direction with respect to the top surface part 50*a*. The handle arm 50 has boosting pin support portions 50*c* penetrating through the pair of sidewall parts 50*b*, in which the boosting pin 6 is inserted, and provided on a rear end-side that is the other end portion-side in an extension direction of the handle arm 50. The boosting pin support portions 50*c* are formed as hole portions penetrating through the pair of sidewall parts 50*b*.

The handle arm 50 also has cam groove portions 50*d* penetrating through the pair of sidewall parts 50*b*, in which the camshaft 23 is inserted, and provided on the rear end-side. The cam groove portions 50*d* are constituted by groove portions penetrating through the pair of sidewall parts 50*b* and each having an open end portion on the clincher unit 2-side, which is one end portion along a direction in which the clincher unit 2 and the handle unit 5 separate from each other.

The handle arm 50 also has restriction concave portions 50*e* in which the restriction convex portions 20*f* of the clincher arm 20 are inserted. The restriction concave portions 50*e* are constituted by rectangular openings penetrating through the pair of sidewall parts 50*b* and long along the moving direction of the handle unit 5 with respect to the clincher unit 2.

The handle arm cover 51 is made of resin, and has a shape covering the top surface part 50*a* and the pair of sidewall parts 50*b* of the handle arm 50. The handle arm cover 51 has guide concave portions 51*a* in which the guide convex portions 20*g* of the clincher arm 20 are inserted. The guide concave portions 51*a* are an example of the guide portion, and are constituted by providing an inner surface of the handle arm cover 51 with groove portions for guiding the handle unit 5 in an operation of opening and closing the handle unit 5 with respect to the clincher unit 2. Note that, the groove portion forming the guide concave portion may be provided on the handle arm 50.

The handle arm 50 can be regarded as a rotation operation when the handle arm 50 is moved, due to a shape of the cam groove portion 50*d* that is guided by the camshaft 23 and a locus on which the boosting pin 6 can move. A virtual fulcrum axis when displacement of the handle arm 50 is regarded as a rotation operation is formed on the rear end-side of the handle arm 50. The handle arm 50 is displaced by a rotation operation about the virtual fulcrum axis as a fulcrum, thereby pressing against the driver arm 40 via the boosting pin 6.

In the handle arm 50, a contact angle between the cam groove portion 50*d* and the camshaft 23 is changed according to the rotation operation of the handle arm 50. Thereby, a direction in which the cam groove portion 50*d* is guided by the camshaft 23 is changed and the virtual fulcrum axis of the rotation operation of the handle arm 50 is moved.

For this reason, for the cam groove portion 50*d*, sections in which the contact angle with the camshaft 23 is made different according to portions to which the camshaft 23 changing due to the rotation operation of the handle arm 50 is contacted are set. In the present example, the cam groove portion 50*d* has a predetermined groove shape where two sections of a first section 50*d*(1) and a second section 50*d*(2) are combined.

The handle arm 50 and the driver arm 40 are rotatably connected at the rear end-side of the handle arm 50 and at the rear end-side of the driver arm 40 by the boosting pin 6.

The boosting pin 6, which is a connecting portion of the handle arm 50 and the driver arm 40, is provided in front of the fulcrum pin 22 for supporting the rear end-side of the driver arm 40 to the clincher arm 20, and a locus on which the boosting pin 6 can move is an arc whose center is the fulcrum pin 22.

Thereby, in the handle arm 50, the tip end-side of the handle unit 5 becomes a force point to which force is applied by the user, the boosting pin 6, which is a connecting portion with the driver arm 40, becomes an action point of force to the driver arm 40, and the virtual fulcrum axis becomes a fulcrum of the rotation operation.

In the driver arm 40, the boosting pin 6, which is a connecting portion with the handle arm 50, becomes a force point to which force is applied by the handle arm 50, the driver 42 becomes an action point of force to the staple 10, and the fulcrum pin 22 becomes a fulcrum of the rotation operation.

The handle unit 5 connected to the driver unit 4 by the boosting pin 6 causes the driver unit 4 to move toward and away from the clincher unit 2 for opening and closing. The handle unit 5 and the driver unit 4 implement a boosting mechanism for reducing a load applied to the handle arm 50 by ratios of distances between the force points and action points and the fulcrums in the handle arm 50 and the driver arm 40.

In the handle arm 50, the contact angle between the cam groove portion 50*d* and the camshaft 23 is changed according to the rotation operation of the handle arm 50, thereby changing a direction in which the cam groove portion 50*d* is guided by the camshaft 23 and moving the virtual fulcrum axis of the rotation operation of the handle arm 50. Thereby, a variable boosting mechanism for changing a rate of decrease in load applied to the handle arm 50 is implemented.

In the present example, the load that is applied to the handle unit 5 is changed in an operation of sandwiching a sheet bundle between the clincher part 20*a* of the clincher unit 2 and the magazine 30 of the magazine unit and in an operation of causing the staple 10 to penetrate through and to bind the sheet bundle.

<Example of Operational Effects of Stapler>

Figure 9:
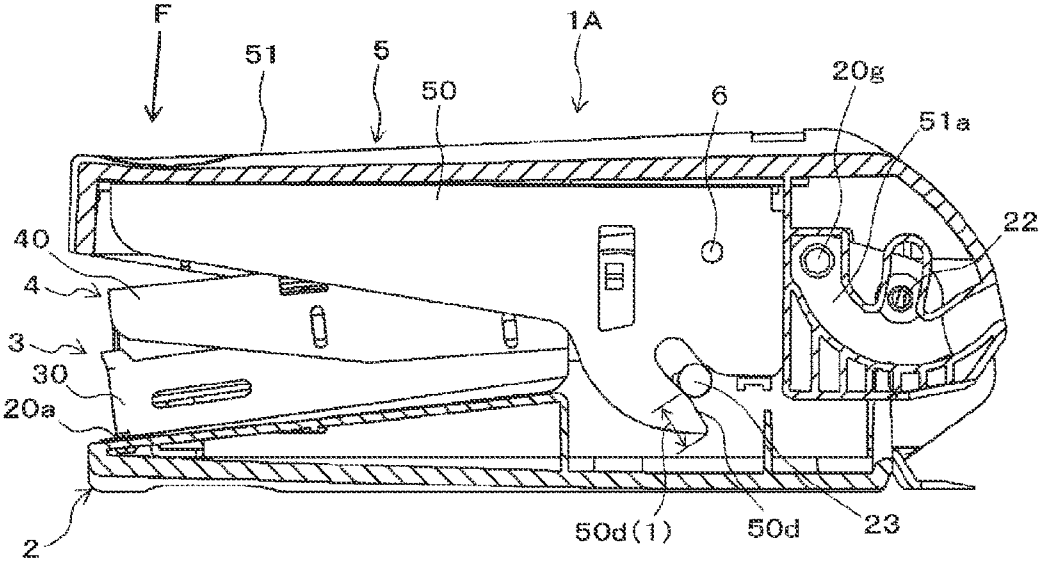
FIG. 9 is a sectional side view showing an operation of binding a sheet bundle with the staple.
Figure 10:
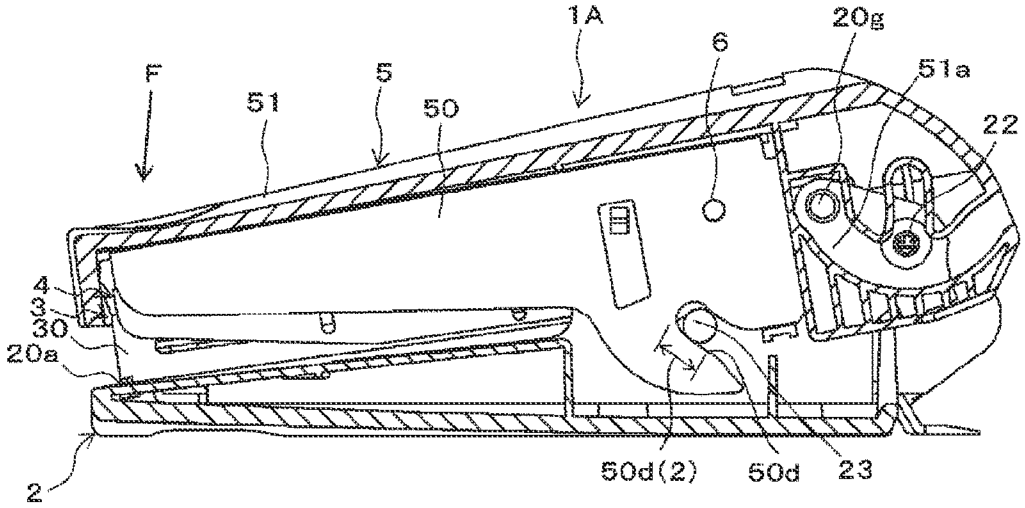
FIG. 10 is a sectional side view showing the operation of binding the sheet bundle with the staple.

FIGS. 9 and 10 are sectional side views showing an operation of binding a sheet bundle with a staple. The operational effects of the variable boosting mechanism are described.

From a standby state shown in FIG. 1, when force of pressing the tip end-side of the handle arm cover 51 of the handle unit 5 toward the clincher unit 2 is applied, as shown with an arrow F in FIG. 9, the tip end-side of the handle unit 5 is moved toward the clincher unit 2 by the rotation operation about the virtual fulcrum axis as a fulcrum. The handle unit 5 is moved toward the clincher unit 2, so that the boosting pin 6 presses the driver unit 4 toward the clincher unit 2 and the driver unit 4 presses the magazine unit 3 toward the clincher unit 2 via the driver arm return spring 41 and the staple cover 43 shown in FIG. 6 and the like. Thereby, the magazine unit 3 and the driver unit 4 are moved toward the clincher unit 2 by the rotation operation about the fulcrum pin 22 as a fulcrum.

In an operation in which the handle unit 5, the driver unit 4 and the magazine unit 3 are moved from the standby state shown in FIG. 1 to a state shown in FIG. 9 to sandwich a sheet bundle between the clincher part 20*a* of the clincher unit 2 and the magazine 30 of the magazine unit 3, the first section 50*d*(1) of the cam groove portion 50*d* is in contact with the camshaft 23. Note that, in FIG. 9, the sheet bundle is not shown. In the state where the first section 50*d*(1) of the cam groove portion 50*d* is in contact with the camshaft 23, the virtual fulcrum axis of the handle unit 5 is near the fulcrum pin 22.

From the state where the sheet bundle is sandwiched between the clincher part 20*a* of the clincher unit 2 and the magazine 30 of the magazine unit 3, when the force of further pressing the tip end-side of the handle arm cover 51 of the handle unit 5 toward the clincher unit 2 is applied, the movement of the magazine unit 3 is restricted by the sheet bundle, and the driver unit 4 is moved toward the magazine unit 3.

When the driver unit 4 is moved toward the magazine unit 3, the driver 42 protrudes into the magazine 30 along the inner surface-side of the magazine front wall part 30*b*. Thereby, one staple 10 at the most tip of the staple bundle 11 loaded in the magazine 30 is separated from the staple bundle 11 and is struck out from the magazine 30. The pair of leg portions 10*b* of the staple 10 struck out from the magazine 30 is caused to penetrate through the sheet bundle and is inwardly bent by the clincher part 20*a*, so that the sheet bundle is bound.

In an operation in which the handle unit 5 and the driver unit 4 are moved from the state shown in FIG. 9 to a state shown in FIG. 10 to cause the staple 10 to penetrate through and to bind the sheet bundle, the second section 50*d*(2) of the cam groove portion 50*d* is in contact with the camshaft 23. Note that, also in FIG. 10, the sheet bundle is not shown. In the state where the second section 50*d*(2) of the cam groove portion 50*d* is in contact with the camshaft 23, the virtual fulcrum axis of the handle unit 5 is moved from the vicinity of the fulcrum pin 22 toward the boosting pin 6.

Thereby, in the operation of sandwiching the sheet bundle between the clincher part 20*a* of the clincher unit 2 and the magazine 30 of the magazine unit 3, a moving amount of the handle arm 50 and a moving amount of the driver arm 40 are close to each other. For this reason, the rate of decrease in load is reduced but an increase in operating amount of the handle unit 5 is suppressed. Therefore, in the standby state shown in FIG. 1, a size between the clincher unit 2 and the handle unit 5 can be reduced, as compared to a stapler where a boosting mechanism is provided but a variable boosting mechanism is not provided.

On the other hand, in the operation of causing the staple 10 to penetrate through and to bind the sheet bundle, the moving amount of the handle arm 50 increases with respect to the moving amount of the driver arm 40, but the rate of decrease in load increases, so that the load applied to the handle arm 50 is reduced.

In the operation of sandwiching the sheet bundle between the clincher part 20*a* of the clincher unit 2 and the magazine 30 of the magazine unit 3, the load that is applied to the handle unit 5 is a reaction force to the force of pressing the magazine return spring 35. For this reason, even when the rate of decrease in load is reduced, a load that is applied to an operator is not so high. On the other hand, in the operation of binding the sheet bundle, since the leg portions 10*b* of the staple 10 are caused to penetrate through the sheet bundle and the leg portions 10*b* are bent, the load that is applied to the handle unit 5 increases. Therefore, in the operation of causing the staple 10 to penetrate through and to bind the sheet bundle, the rate of decrease in load is increased to reduce the load that is applied to the handle arm 50, thereby reducing the load on the operator.

FIGS. 11, 12, 13 and 14 are sectional side views showing an operation of opening and closing the handle unit. As for the stapler 1A having the variable boosting mechanism, the operational effects of opening and closing the handle unit 5 are described.

Figure 11:
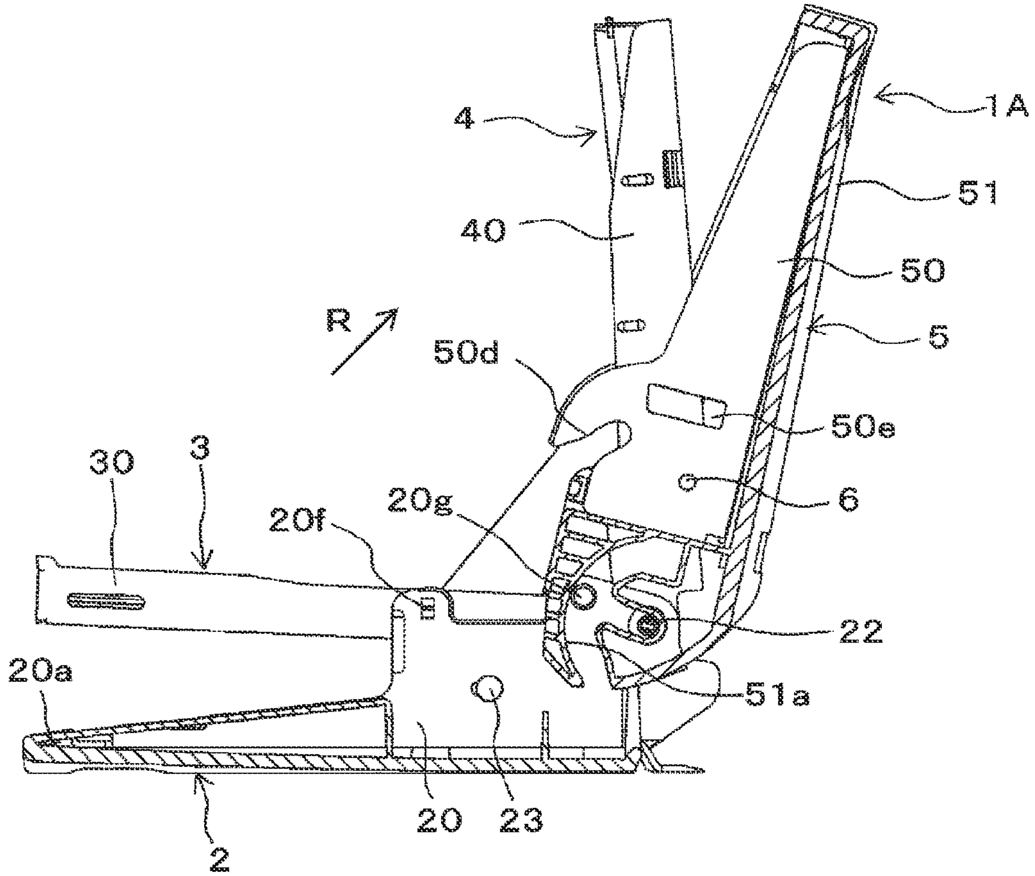
FIG. 11 is a sectional side view showing an operation of opening and closing a handle unit.

From the standby state shown in FIG. 1, when force of separating the handle unit 5 from the clincher unit 2 is applied, as shown with an arrow R in FIG. 11, the restriction concave portions 50*e* of the handle unit 5 separate from the restriction convex portions 20*f* of the clincher unit 2. The cam groove portions 50*d* of the handle unit 5 also separate from the camshaft 23. In a state where the guide concave portions 51*a* of the handle unit 5 are guided by the guide convex portion 20*g* of the clincher unit 2 and the movement path of the handle unit 5 is thus restricted, the tip end-side of the handle unit 5 is moved away from the clincher unit 2.

Figure 13:
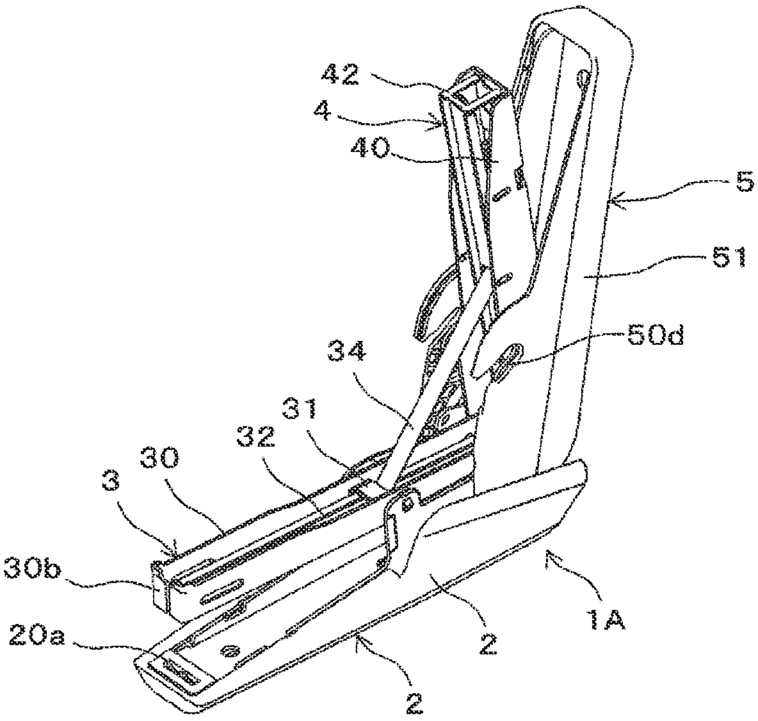
FIG. 13 is a sectional side view showing the operation of opening and closing the handle unit.

When the tip end-side of the handle unit 5 is moved away from the clincher unit 2, the driver unit 4 connected to the handle unit 5 by the boosting pin 6 is moved away from the magazine unit 3 by the rotation operation about the fulcrum pin 22 as a fulcrum. When the driver unit 4 is moved away from the magazine unit 3, the pusher band 34 pulls the pusher 31, so that the pusher 31 is guided by the pusher guide 32 and is moved toward the rear end-side of the magazine 30, as shown in FIG. 13.

Figure 12:
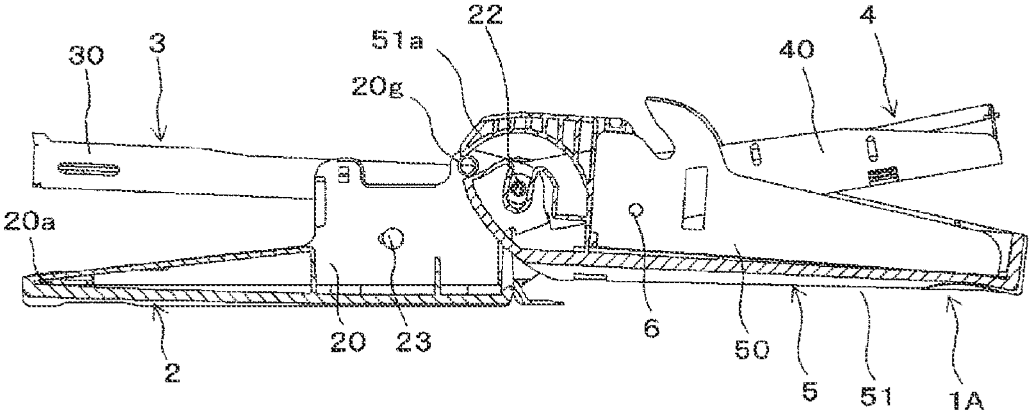
FIG. 12 is a sectional side view showing the operation of opening and closing the handle unit.
Figure 14:
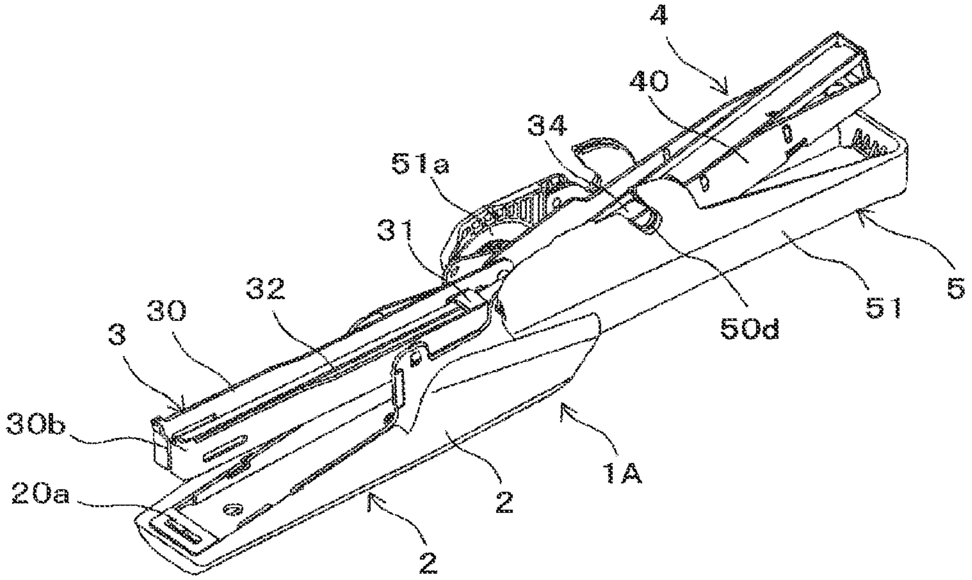
FIG. 14 is a sectional side view showing the operation of opening and closing the handle unit.

When the handle unit 5 and the driver unit 4 are moved from a state shown in FIG. 11 to a state in which they are substantially horizontal with respect to the clincher unit 2 and the magazine unit 3, as shown in FIG. 12, the pusher 31 is moved to the most retreat position, as shown in FIG. 14. Thereby, a space in which the staple bundle 11 can be loaded is formed between the inner surface-side of the magazine front wall part 30*b* and the pusher 31.

As shown in FIG. 12, when the handle unit 5 and the driver unit 4 are moved from an open state in which they are substantially horizontal with respect to the clincher unit 2 and the magazine unit 3 in a direction of erecting the handle unit 5, the guide concave portions 51*a* of the handle unit 5 are guided by the guide convex portions 20*g* of the clincher unit 2. Thereby, in a state where the movement path of the handle unit 5 is restricted, the handle unit 5 is moved in a direction of erecting with respect to the clincher unit 2 and the magazine unit 3, as shown in FIG. 11.

As shown in FIG. 11, when the handle unit 5 is moved in the direction of erecting with respect to the clincher unit 2 and the magazine unit 3, the driver unit 4 connected to the handle unit 5 by the boosting pin 6 is moved in the direction of erecting with respect to the clincher unit 2 and the magazine unit 3 by the rotation operation about the fulcrum pin 22 as a fulcrum.

When the driver unit 4 is moved in the direction of erecting with respect to the clincher unit 2 and the magazine unit 3, the pusher 31 is moved toward the tip end-side of the magazine 30 by the pusher spring 33.

As shown in FIG. 11, when the handle unit 5 and the driver unit 4 are moved from the state where they are erected with respect to the clincher unit 2 and the magazine unit 3 in a direction in which the handle unit 5 comes close to the clincher unit 2, the guide concave portions 51*a* of the handle unit 5 are guided by the guide convex portions 20*g* of the clincher unit 2. Thereby, in a state where the movement path of the handle unit 5 is restricted, the handle unit 5 is moved toward the clincher unit 2 and the magazine unit 3.

When the handle unit 5 is moved toward the clincher unit 2 and the magazine unit 3, the driver unit 4 connected to the handle unit 5 by the boosting pin 6 is moved toward the clincher unit 2 and the magazine unit 3 by the rotation operation about the fulcrum pin 22 as a fulcrum.

When the driver unit 4 is moved toward the clincher unit 2 and the magazine unit 3, the pusher 31 is moved toward the tip end-side of the magazine 30 by the pusher spring 33. In a case where the staples 10 are loaded in the magazine 30, the staples 10 are pressed against the magazine front wall part 30*b* by the pusher 31.

When the handle unit 5 is further moved toward the clincher unit 2, the guide concave portions 51*a* of the handle unit 5 are guided by the guide convex portions 20*g* of the clincher unit 2, so that the handle unit 5 is moved toward the clincher unit 2 and the magazine unit 3 in the state where the movement path of the handle unit 5 is restricted. Thereby, the cam groove portions 50*d* of the handle unit 5 enter the camshaft 23. In addition, the restriction concave portions 50*e* of the handle unit 5 are fitted with the restriction convex portions 20*f* of the clincher unit 2.

The stapler 1A having the variable boosting mechanism has a configuration of changing the contact angle between the cam groove portion 50*d* and the camshaft 23 according to the rotation operation of the handle arm 50, thereby moving the virtual fulcrum axis of the rotation operation of the handle arm 50. The cam groove portions 50*d* are each constituted by the groove portion having an open end portion on the clincher unit 2-side, so that when the handle unit 5 is moved away from the clincher unit 2, the cam groove portions 50*d* separate from the camshaft 23. Therefore, the handle unit 5 and the driver unit 4 can be opened with respect to the clincher unit 2 and the magazine unit 3.

In the meantime, the handle unit 5 has a configuration where the handle arm 50 is connected to the driver arm 40 of the driver unit 4 by the boosting pin 6 and can rotate about the boosting pin 6 as a fulcrum with respect to the driver unit 4.

For this reason, during the operation of moving the handle unit 5 toward the clincher unit 2 from the state where the handle unit 5 and the driver unit 4 are opened with respect to the clincher unit 2 and the magazine unit 3, if a direction of the handle unit 5 is not set, it is difficult to put the cam groove portions 50*d* of the handle unit 5 into the camshaft 23.

Therefore, the guide concave portions 51*a* provided to the handle unit 5 are caused to be guided by the guide convex portions 20*g* provided to the clincher unit 2, so that the movement path of the handle unit 5 can be restricted. Thereby, during the operation of moving the handle unit 5 toward the clincher unit 2 and the magazine unit 3, the cam groove portions 50*d* of the handle unit 5 can be put into the camshaft 23. Therefore, according to the stapler 1A having the variable boosting mechanism, the top surface-side of the magazine 30 is opened in the operation of opening and closing the handle unit 5, so that the staple bundle 11 can be loaded. Therefore, it is not necessary to provide a mechanism for sliding the magazine, for example, so that it is possible to simplify the structure and to save the cost.

Figure 15:
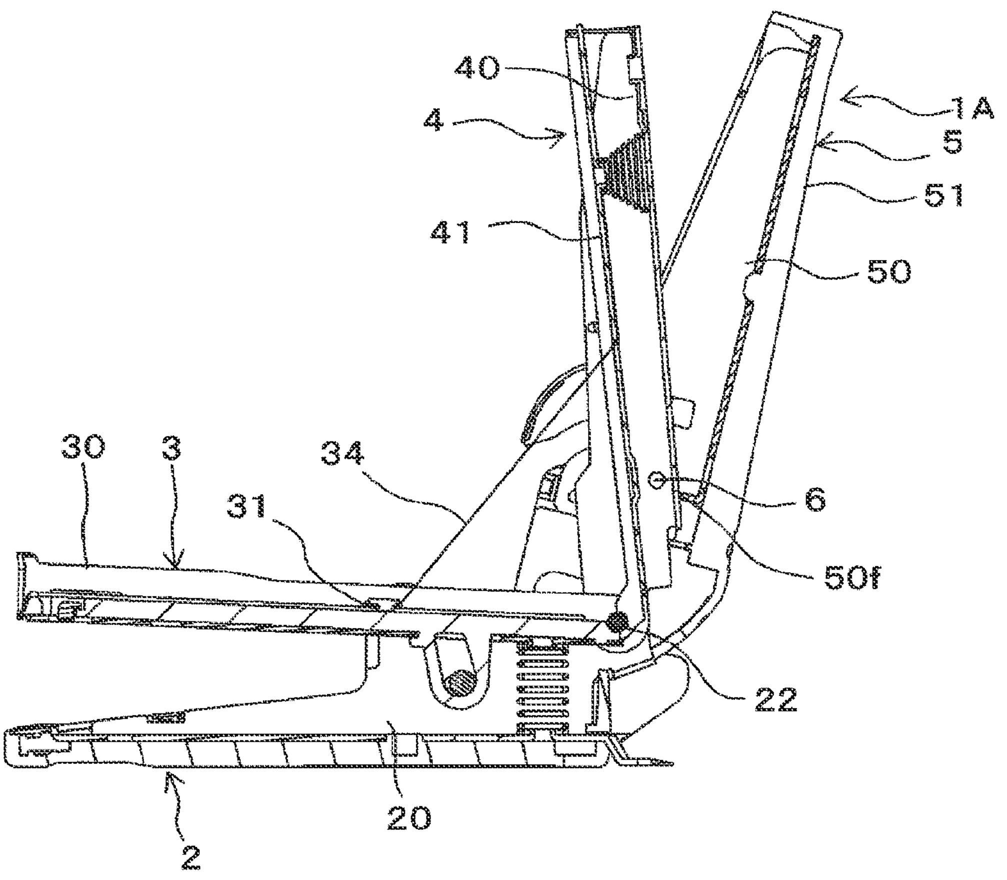
FIG. 15 is a sectional side view showing a modified embodiment of the operation of opening and closing the handle unit.

FIG. 15 is a sectional side view showing a modified embodiment of the operation of opening and closing the handle unit. As the guide portion for restricting the movement path during the operation of opening and closing the handle unit 5, the inner surface of the handle arm 50 of the handle unit 5 may be provided with a restriction convex portion 50*f* configured to contact the driver arm 40 of the driver unit 4, so as to restrict the direction of the handle unit 5 with respect to the driver unit 4.

Figure 16:
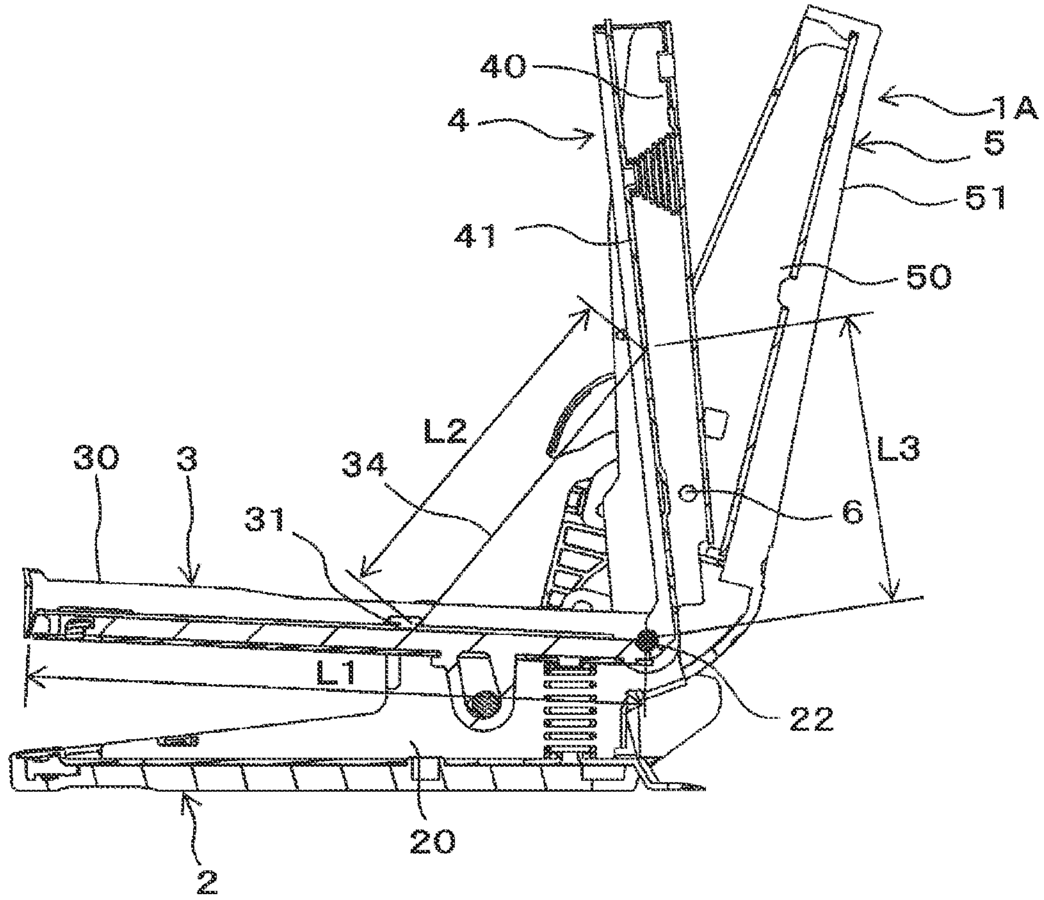
FIG. 16 is a sectional side view showing an operation of opening and closing the handle unit to load a staple bundle.
Figure 17:
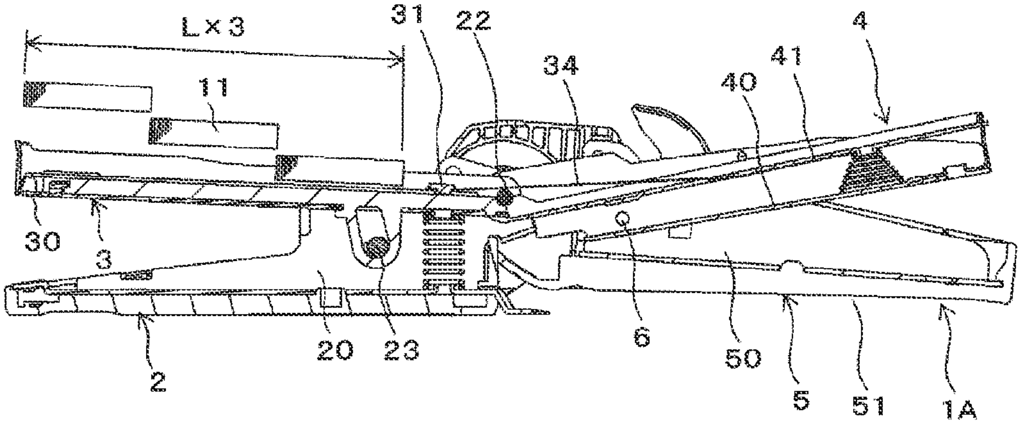
FIG. 17 is a sectional side view showing the operation of opening and closing the handle unit to load the staple bundle.

FIGS. 16 and 17 are sectional side view showing an operation of opening and closing the handle unit to load a staple bundle. As for the stapler 1A having the variable boosting mechanism, the operational effects of loading the three staple bundles 11 of JIS No. 10 needle in the magazine 30 are described.

A length L of the staple bundle 11 where the staples 10 called JIS No. 10 needle are connected to each other is about 25 mm. For this reason, in order to load the three staple bundles 11 in the magazine 30, it is necessary to secure a length of 75 mm or longer between the inner surface-side of the magazine front wall part 30*b* and the pusher 31 in a state where the pusher 31 is moved to the most retreat position, as shown in FIG. 17.

Therefore, as shown in FIG. 16, a length L1 of the magazine 30 is set to 90 mm or longer and 100 mm or shorter. The length of the magazine 30 is a length from the inner surface-side of the magazine front wall part 30*b* to the fulcrum pin 22. As shown in FIG. 8D, in the state where the pusher 31 is moved to the most retreat position, the pusher spring 33 is extended in the operation in which the pusher 31 is moved toward the rear end-side of the magazine 30, so that it is not necessary to secure a space for accommodating the compressed spring between the pusher 31 and the rear end-side of the magazine 30 and it is possible to increase a retreat amount of the pusher 31. Therefore, it is possible to suppress an increase in length of the magazine 30 in which the three staple bundles 11 can be loaded.

In addition, as shown in FIGS. 16 and 17, in order to move the pusher 31 in the operation of opening and closing the handle unit 5, a length L2 of the pusher band 34 is set to 51 mm or longer and 61 mm or shorter. The length of the pusher band 34 is a length from one end portion exposed from the pusher 31 to the other end portion exposed from the opening portion 43*e* of the staple cover 43. Further, a length L3 from the fulcrum pin 22 to an attachment position of the pusher band 34 to the driver unit 4 is set to 41 mm or longer and 50 mm or shorter.

In addition, a ratio (L1:L2) of the length L1 of the magazine 30 and the length L2 of the pusher band 34 is set to 10:5.7 to 6.1. Further, a ratio (L1:L3) of the length L1 of the magazine 30 and the length L3 from the fulcrum pin 22 to the attachment position of the pusher band 34 to the driver unit 4 is set to 10:4.6 to 5.0.

In order to make the stapler 1A large enough to be held and operated with a hand, a length L4 of the stapler 1A is set to 105 mm or longer and 125 mm or shorter. The length of the stapler 1A is a length from the tip end of the clincher arm cover 21 of the clincher unit 2 to the rear end of the handle arm cover 51 of the handle unit 5, in the stapler 1A in the standby state, as shown in FIG. 1.

Thereby, in the stapler 1A large enough to be held and operated with a hand, the three staple bundles 11 of JIS No. 10 needle can be loaded in the magazine 30. Therefore, it is possible to reduce the frequency to load the staple bundle 11. Further, even when the moving amount of the pusher 31 in the operation of opening and closing the handle unit 5 is equal to or greater than a length of the three staple bundles 11 of JIS No. 10 needle, the movement of the pusher 31 in the operation of opening and closing the handle unit 5 is not hindered.

In the stapler 1A large enough to be held and operated with a hand where the three staple bundles 11 of JIS No. 10 needle can be loaded in the magazine 30, the variable boosting mechanism is provided, so that the rate of decrease in load can be switched so that a load is adjusted according to the operation in each process of the operation of binding the sheet bundle. In addition, the variable boosting mechanism is provided, so that it is possible to reduce a size between the clincher unit 2 and the handle unit 5, as compared to a stapler where the boosting mechanism is provided but the variable boosting mechanism is not provided. Further, it is possible to load the staple bundle 11 in the magazine 30 by opening and closing the handle unit 5.

Further, the stapler 1A is usually used in such an aspect that a thumb is put on the tip end-side of the stapler 1A, which is a striking-side of the staple 10. On the other hand, in actual use circumstances, contrary to normal, in many cases, the stapler 1A is used in a reverse holding aspect that the stapler 1A is gripped with the rear end-side of the stapler 1A facing up and the striking-side of the staple 10 facing down and the thumb is touched on the rear end-side of the handle unit 5. Therefore, as shown in FIG. 4, considering a case where the stapler is used in a reverse holding aspect, the rear end-side of the handle arm cover 51 of the stapler 1A may be provided with a finger setting portion 51*b* at a part on which the thumb is touched. The finger setting portion 51*b* is formed by a depression or a projection, which improves feel and holding, thereby enhancing holdability. In addition, when performing the binding operation, it is easy to apply the force and the operation feeling is good, which improves the operability.

In the below, a second embodiment of the present invention is described in detail with reference to FIGS. 18 to 32B.

Figure 18:
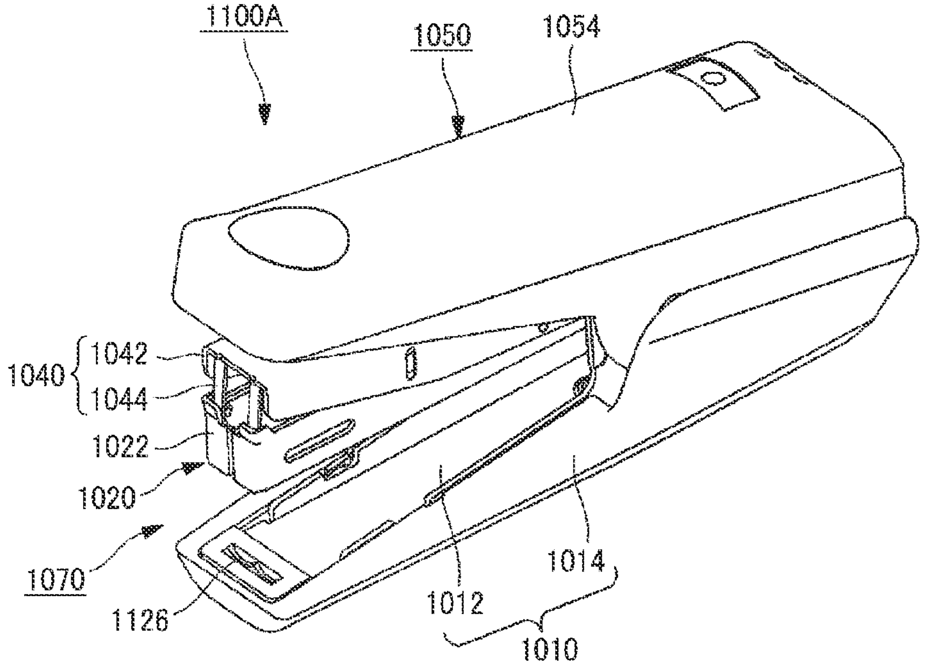
FIG. 18 is a perspective view showing a stapler according to a second embodiment of the present invention.
Figure 19:
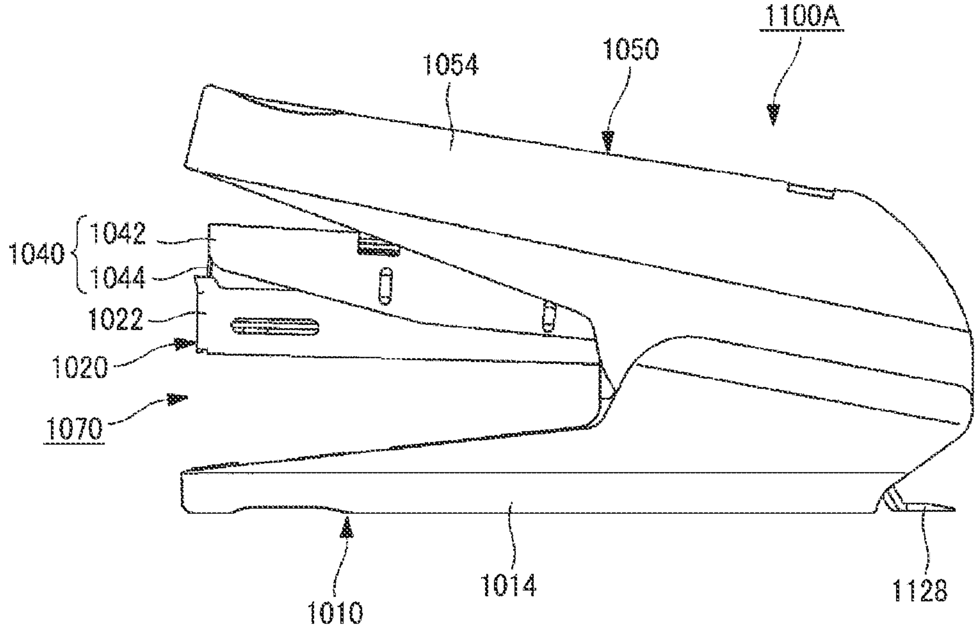
FIG. 19 is a side view of the stapler.
Figure 20:
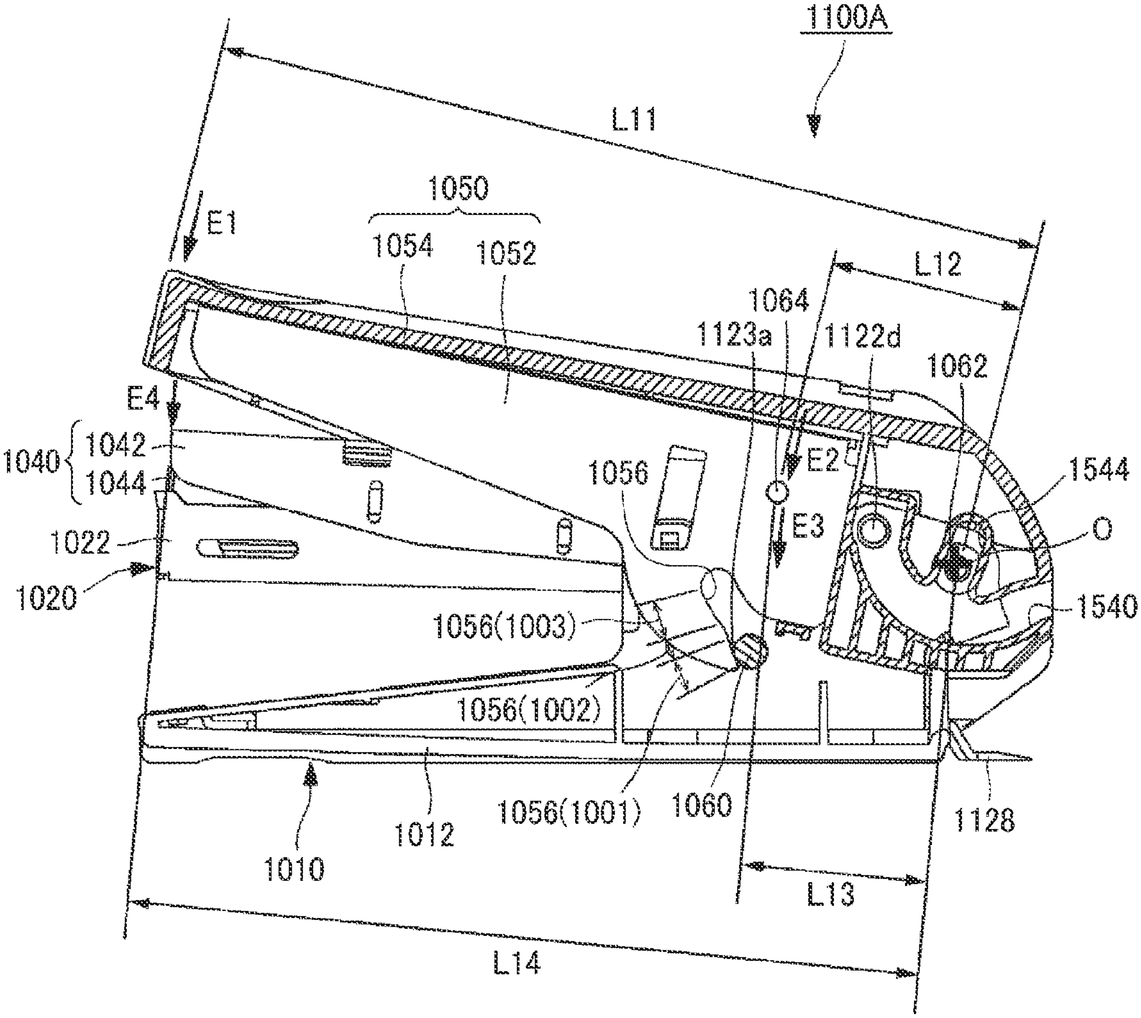
FIG. 20 is a sectional view of the stapler (1 thereof).
Figure 21:
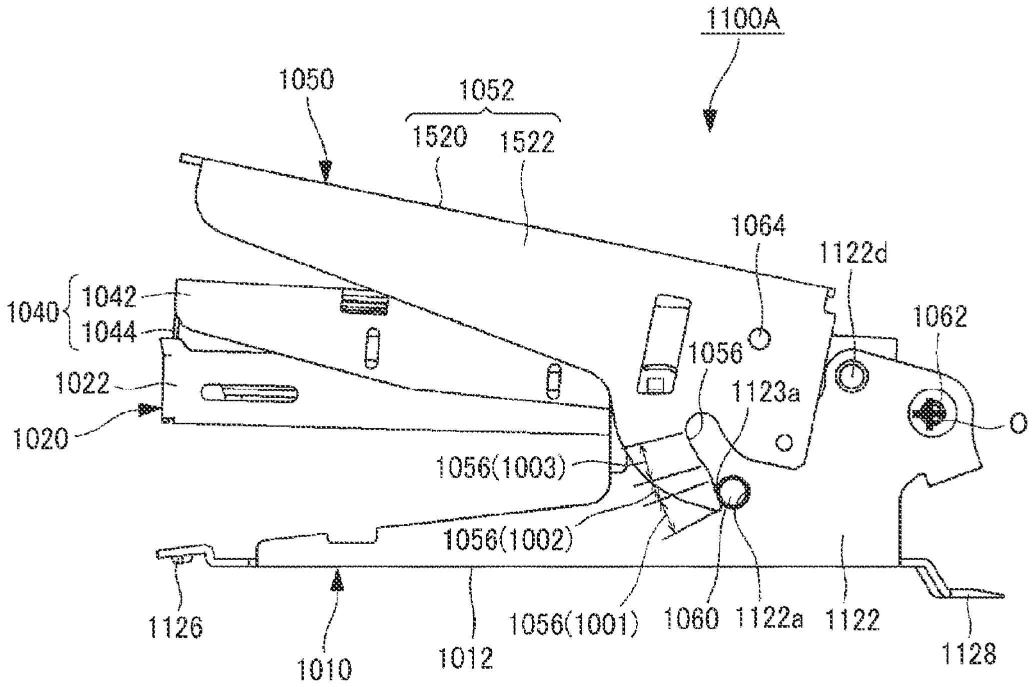
FIG. 21 is a side view showing a state where a handle cover and the like of the stapler are detached (1 thereof).
Figure 22:
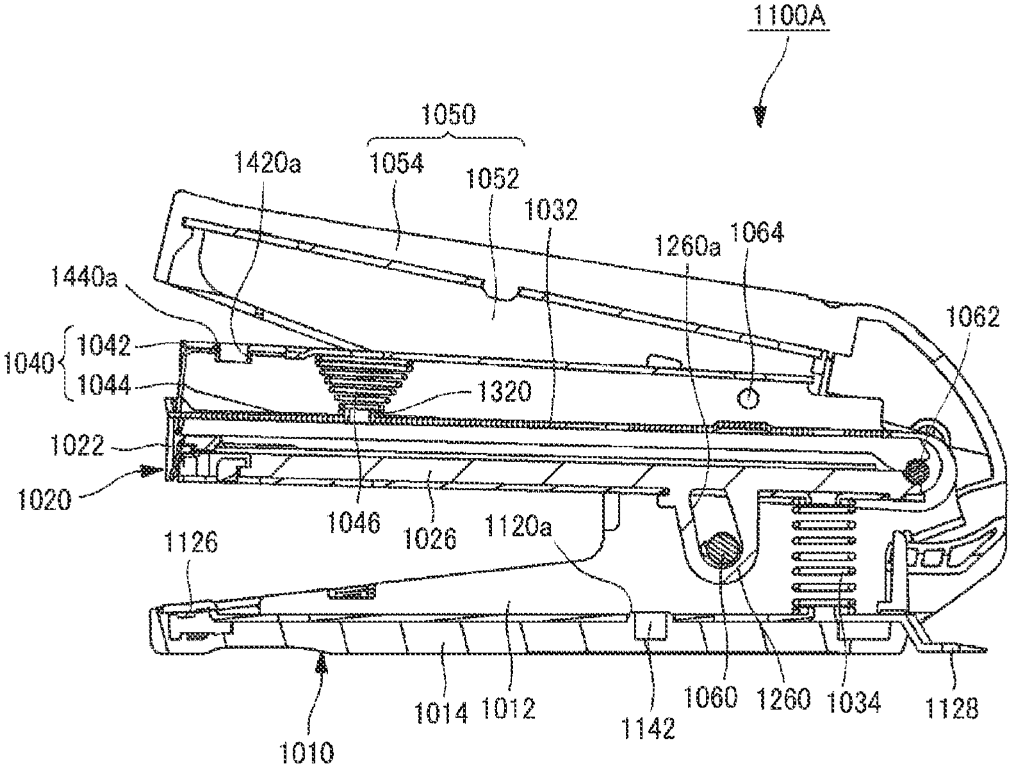
FIG. 22 is a sectional view of the stapler (2 thereof).
Figure 23:
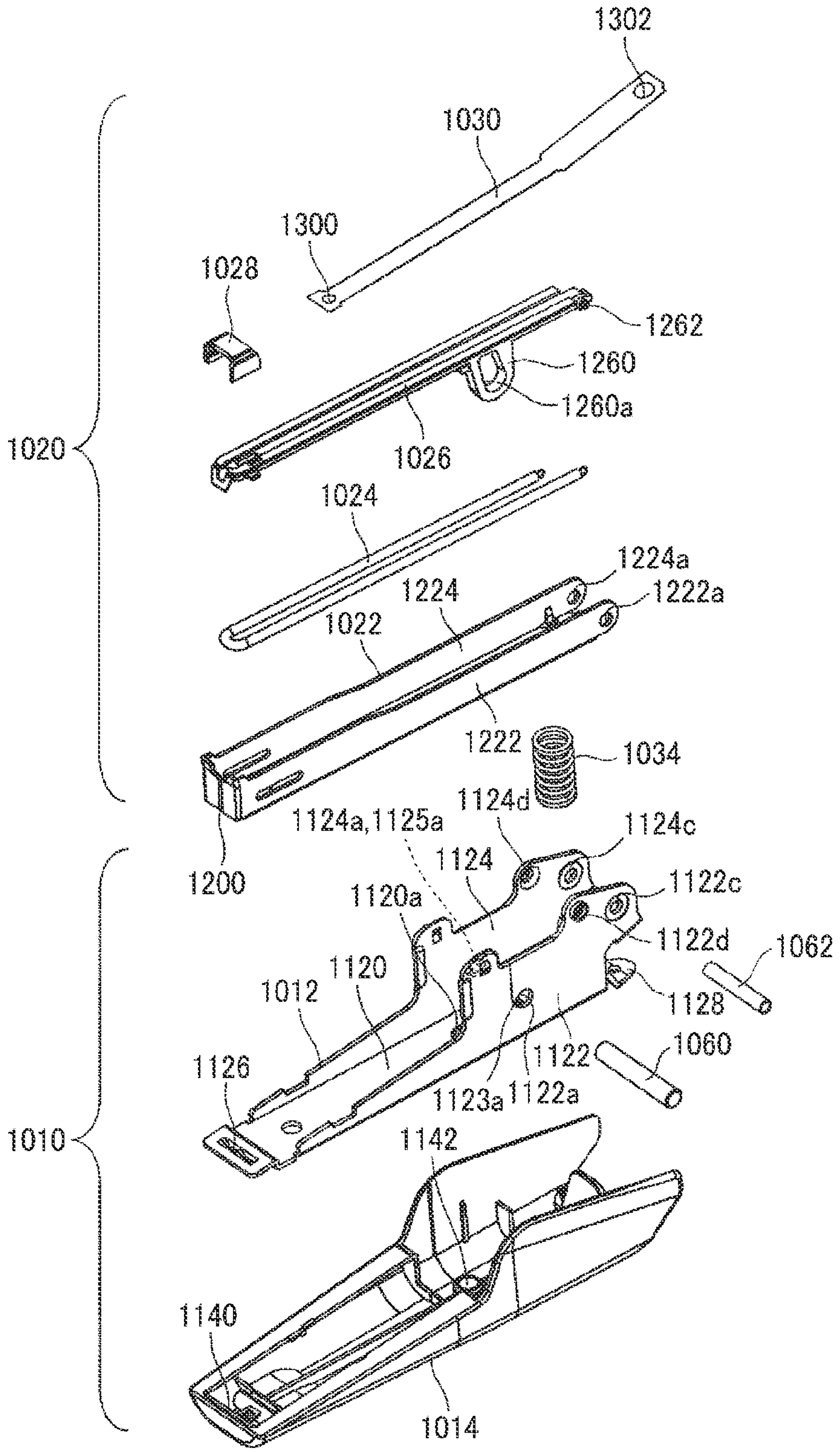
FIG. 23 is an exploded perspective view of the stapler (1 thereof).
Figure 24:
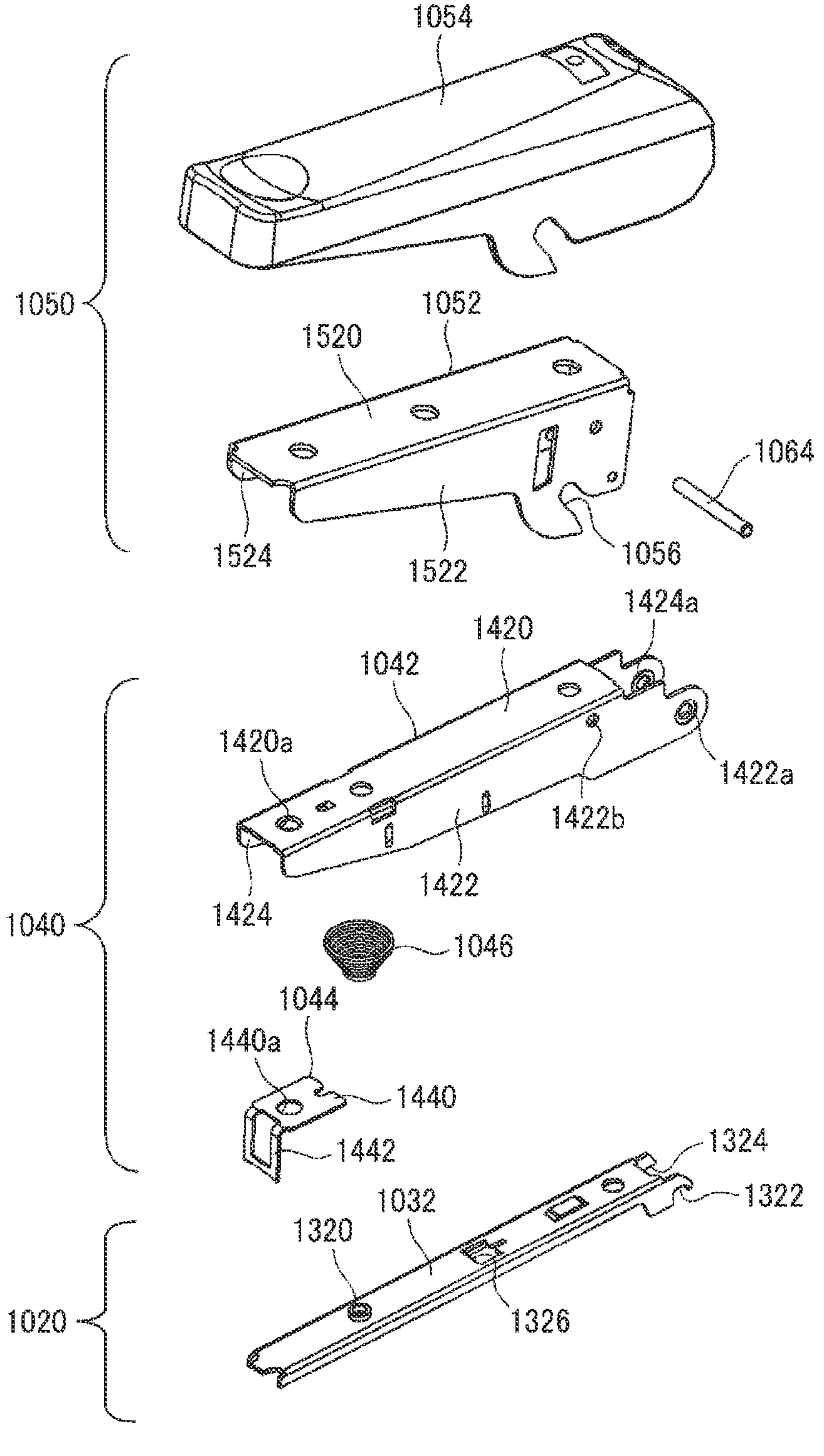
FIG. 24 is an exploded perspective view of the stapler (2 thereof).

FIG. 18 is a perspective view showing a stapler 1100A according to the present embodiment. FIG. 19 is aside view of the stapler 1100A. FIG. 20 is a sectional view of the stapler 1100A. FIG. 21 is aside view showing a state where a handle cover 1054, and the like of the stapler 1100A are detached. FIG. 22 is a sectional view taken along a center of the stapler 1100A. FIGS. 23 and 24 are exploded perspective views of the stapler 1100A.

[Configuration Example of Stapler 1100A]

As shown in FIGS. 18, 19 and 21 and the like, a stapler 1100A includes a handle unit (operating member) 1050 configured to be displaced by receiving force from an operator, and a binding member 1070 configured to rotate relative to the handle unit 1050 about a fulcrum pin 1062 as a fulcrum by receiving a load from the handle unit 1050. The binding member 1070 includes a magazine unit 1020 in which staples are loaded, a driver unit 1040 connected to the handle unit 1050 via a boosting pin (connecting portion) 1064 and having a driver 1044 configured to separate the staples loaded in the magazine unit 1020 into one staple and to strike out the same, a clincher unit 1010 configured to rotatably support the magazine unit 1020 and the driver unit 1040 and to bend the staple penetrating through a sheet, and a camshaft (shaft portion) 1060 supported in a shaft hole (hole portion) 1122*a* provided to the clincher unit 1010 and configured to support the handle unit 1050.

Note that, in the present embodiment, the clincher unit 1010-side is referred to as a lower side of the stapler 1100A, and the handle unit 1050-side opposite to the lower side is referred to as an upper side of the stapler 1100A. Also, the driver 1044-side provided to the driver unit 1040 is referred to as a front side of the stapler 1100A, and an opposite side is referred to as a rear side of the stapler 1100A.

[Configuration Example of Clincher Unit 1010]

The clincher unit 1010 has a clincher arm 1012 configured to bend inwardly the leg portions of the staple penetrating through the sheet bundle, and a clincher cover 1014 for protecting the clincher arm 1012.

As shown in FIGS. 21 to 23, and the like, the clincher arm 1012 is formed by bending a metal plate into a substantial U-shape, and has a long base part 1120 extending in the front and rear direction and bearing parts 1122 and 1124 erected from left and right side surfaces of the base part 1120 at a rear part of the base part 1120.

At the rear of the center of the base part 1120, an opening portion 1120*a* that can be fitted with a convex portion 1142 (which will be described later) formed on the clincher cover 1014 is formed.

The bearing parts 1122 and 1124 are formed at rear end portions with shaft holes 1122*c* and 1124*c* for supporting the fulcrum pin 1062. The bearing parts 1122 and 1124 are formed with support portions 1122*d* and 1124*d* for rotatably supporting the handle cover 1054 slightly in front of the shaft holes 1122*c* and 1124*c*. The support portions 1122*d* and 1124*d* are formed to annularly protrude from outer surfaces of the bearing parts 1122 and 1124. The bearing parts 1122 and 1124 are formed at the substantially central portions with shaft holes 1122*a* and 1124*a* (refer to FIG. 23) for supporting the camshaft 1060. At the peripheries of the shaft holes 1122*a* and 1124*a*, holding portions 1123*a* and 1125*a* (refer to FIG. 23) for storing grease as lubricant for reducing friction between the camshaft 1060 and other components such as the handle unit 1050 are provided. Note that, the holding portions 1123*a* and 1125*a* will be described in detail later.

The clincher arm 1012 also has a clincher groove portion 1126, and a remover 1128.

As shown in FIGS. 22 and 23, and the like, the clincher groove portion 1126 is provided at the front end portion of the base part 1120, and is attached to an attachment portion 1140 of the clincher cover 1014, which will be described later. The clincher groove portion 1126 is configured to bend the pair of leg portions of the staple penetrating through the sheet bundle into a glasses-shape by the binding force, thereby binding the sheet bundle by the staple. Note that, the bent shape of the staple is not limited to the glasses-shape, and may be a flat shape. As a mechanism for implementing the flat shape, a well-known technology can be adopted.

The remover 1128 is provided at the rear end portion of the base part 1120, and protrudes outward from the rear end-side of the clincher cover 1014. The remover 1128 is tapered rearward, as seen from a side, and is configured to be inserted between the crown portion of the staple and the sheet bundle to remove the staple from the sheet bundle.

As shown in FIG. 23 and the like, the clincher cover 1014 is formed by forming a resin material into a U-sectioned shape, for example, and is attached to the clincher arm 1012 to cover a backside of the base part 1120 of the clincher arm 1012 and side surface parts of the bearing parts 1122 and 1124. The clincher cover 1014 is provided at a front end portion of an inner side with the attachment portion 1140 for attaching the clincher arm 1012. A convex portion 1142 to which the opening portion 1120*a* of the clincher arm 1012 is fitted is provided slightly behind the center of the inner side of the clincher cover 1014.

[Configuration Example of Magazine Unit 1020]

The magazine unit 1020 has a pusher spring 1024, a pusher guide 1026, a pusher 1028 and a pusher band 1030, in addition to a magazine 1022 in which the staples are loaded.

As shown in FIGS. 20 to 23, the magazine 1022 has an elongated box shape whose upper and rear parts are opened, and is arranged inside the clincher arm 1012. In the present embodiment, maximum of three connection staples each of which is formed by bonding and connecting 50 staples can be continuously loaded in the magazine 1022. A front end portion of a lower surface of the magazine 1022 is formed with a striking-out opening 1200 for striking out the leading staple loaded in the magazine 1022 toward a sheet bundle.

Rear end portions of sidewall parts 1222 and 1224 constituting the magazine 1022 are formed with shaft holes 1222*a* and 1224*a*. In the shaft holes 1222*a* and 1224*a*, the fulcrum pin 1062 supported by the bearing parts 1122 and 1124 of the clincher arm 1012 is inserted. Thereby, the magazine 1022 can rotate relative to the clincher arm 1012 about the fulcrum pin 1062 as a fulcrum of the clincher arm 1012.

As shown in FIGS. 22 and 23, a magazine return spring 1034 constituted by a compression spring is arranged between a rear part of the clincher arm 1012 and a rear part of the magazine 1022. The magazine return spring 1034 rotationally urges the magazine 1022 toward the driver unit 1040, thereby securing a gap for inserting the sheet bundle between the clincher groove portion 1126 and the striking-out opening 1200 of the magazine 1022.

As shown in FIGS. 22 and 23, the pusher guide 1026 is a plate-shaped member extending in the front and rear direction, and is arranged in the magazine 1022. A lower surface on the rear part-side of the pusher guide 1026 is provided with a restriction portion 1260 protruding (exposed) from an opening portion (not shown) formed in a lower surface of the magazine 1022 toward the clincher arm 1012. The restriction portion 1260 is formed with a long hole 1260*a* extending in the upper and lower direction. In the long hole 1260*a* of the restriction portion 1260, the camshaft 1060 supported by the clincher arm 1012 is inserted, so that a movement range of the magazine 1022 in the upper and lower direction is restricted by the long hole 1260*a*.

As shown in FIG. 23 and the like, the pusher 1028 is a member configured to press the staples loaded in the magazine 1022 toward the striking-out opening 1200, and is slidably engaged to the pusher guide 1026.

As shown in FIG. 23, the pusher spring 1024 is a U-shaped tension spring, and is arranged between the magazine 1022 and the pusher guide 1026. An open side of the pusher spring 1024 is directed rearward. One end portion of the pusher spring 1024 is attached to an attachment portion 1262 provided at the rear end portion of the pusher guide 1026, and the other end portion of the pusher spring 1024 is attached to an attachment portion (not shown) provided to the pusher 1028.

By the above configuration, the pusher 1028 is pressed toward the striking-out opening 1200 by the pusher spring 1024, thereby urging the staples loaded in the magazine 1022 toward the striking-out opening 1200 and moving the staples toward the striking-out opening 1200.

As shown in FIGS. 22 and 24, the staple cover 1032 has substantially the same length as a length of the magazine 1022 in the front and rear direction, and is configured to cover the staples loaded in the magazine 1022. A front end-side of an upper surface of the staple cover 1032 is provided with a mounting portion 1320. The mounting portion 1320 is engaged with the other end portion of the pusher band 1030 and one end portion of the driver arm return spring 1046 constituted by a compression spring. A rear end portion of the staple cover 1032 is provided with engaging portions 1322 and 1324 to be rotatably engaged with the fulcrum pin 1062 supported by the clincher arm 1012. An opening portion 1326 for attaching the pusher band 1030 to the mounting portion 1320 on the upper surface of the staple cover 1032 is provided slightly in front of the engaging portion 1322 and the like of the staple cover 1032.

As shown in FIG. 23, the pusher band 1030 is constituted by a long film member, for example. One end portion 1300 of the pusher band 1030 is attached to the pusher 1028, the pusher band 1030 passes through the opening portion 1326, and the other end portion 1302 of the pusher band 1030 is attached to the mounting portion 1320 provided on the staple cover 1032.

As shown in FIGS. 22 and 24, a driver arm return spring 1046 constituted by a compression spring is arranged between the staple cover 1032 and the driver arm 1042. The driver arm return spring 1046 rotationally urges the driver arm 1042 so that the driver 1044 stands by in a predetermined position above the striking-out opening 1200 of the magazine 1022.

[Configuration Example of Driver Unit 1040]

The driver unit 1040 has a driver arm 1042 configured to be displaced in a rotation operation by receiving force from the handle unit 1050 at the boosting pin 1064, and a driver 1044 configured to press the leading staple loaded in the magazine 1022 by rotation of the driver arm 1042 and to cause the staple to penetrate through the sheet bundle.

The driver arm 1042 is arranged between an inner surface of the clincher arm 1012 and an outer surface of the magazine 1022, and is rotatably attached to the bearing parts 1122 and 1124 of the clincher arm 1012.

As shown in FIG. 24, the driver arm 1042 is formed by bending a metal plate into a substantial U-shape, and has a long top surface part 1420 extending in the front and rear direction and side surface parts 1422 and 1424 extending downward from left and right side surfaces of the top surface part 1420.

As shown in FIGS. 22 and 24, a lower surface of the front end-side of the top surface part 1420 is provided with an attachment portion 1420*a* for attaching the driver 1044. Rear end portions of the side surface parts 1422 and 1424 are each formed with shaft holes 1422*a* and 1424*a*. In the shaft holes 1422*a* and 1424*a*, the fulcrum pin 1062 supported by the bearing parts 1122 and 1124 of the clincher arm 1012 is inserted. Thereby, the driver arm 1042 can rotate relative to the clincher arm 1012 about the fulcrum pin 1062 as a fulcrum of the clincher arm 1012.

As shown in FIGS. 22 and 24, the driver 1044 is formed by bending a metal plate into a substantial L-shape, and has an attachment portion 1440 and a pressing portion 1442. The attachment portion 1440 is formed with an opening portion 1440*a*, and the opening portion 1440*a* is fitted with the attachment portion 1420*a* of the driver arm 1042. A width of the pressing portion 1442 in the right and left direction is selected to be substantially the same as a size of the crown portion of the staple, and a plate thickness of the pressing portion 1442 is selected to be substantially the same as a needle wire width of one staple.

[Configuration Example of Handle Unit 1050]

The handle unit 1050 has a handle arm 1052 configured to press the driver arm 1042, and a handle cover 1054 for protecting the handle arm 1052.

As shown in FIGS. 20, 21 and 24, the handle arm 1052 is formed by bending a metal plate into a substantial U-shape, and has a long top surface part 1520 extending in the front and rear direction and side surface parts 1522 and 1524 extending downward from left and right side surfaces of the top surface part 1520.

The boosting pin 1064 is inserted in rear parts of the side surface parts 1522 and 1524 of the handle arm 1052, so that the handle arm 1052 is rotatably supported via the boosting pin 1064 by the driver arm 1042. The boosting pin 1064 is provided in front of the fulcrum pin 1062.

A downwardly protruding portion from the rear part of the side surface part 1522 is formed with a cam groove (guide portion) 1056 that can slide on the camshaft 1060 of the clincher arm 1012. The cam groove 1056 is opened on a lower end-side. Thereby, in the opening operation of the handle unit 1050, the cam groove 1056 of the handle arm 1052 separates from the camshaft 1060, so that the upper side of the magazine 1022 is opened and the staples can be thus loaded from the upper side of the magazine 1022. Note that, although not shown in FIG. 20 and the like, the side surface parts 1522 and 1524 of the handle arm 1052 are bilaterally symmetrical and have a common configuration. Therefore, the side surface part 1524 is also provided with a cam groove as a guide portion having a function and a shape similar to the cam groove 1056.

As shown in FIGS. 20 and 24, and the like, the handle cover 1054 is formed by bending a resin plate into a substantial U-shape, and covers an outer peripheral surface of the handle arm 1052, the rear part of the driver unit 1040 and the rear part of the magazine unit 1020. The fulcrum pin 1062 supported by the bearing parts 1122 and 1124 of the clincher arm 1012 is positioned in a groove portion 1544 provided on an inner side of the rear part of the handle cover 1054, and when opening and closing the handle cover 1054, the groove portion 1544 functions as an escape groove in which the fulcrum pin 1062 moves up and down.

A groove-shaped guide portion 1540 configured to slidably engage to the support portion 1122*d* of the clincher arm 1012 is formed on an inner side of a side surface of the rear part of the handle cover 1054. Note that, in FIG. 20, only the guide portion 1540 on the left side surface-side is shown. However, a similar guide portion is also provided on the right side surface-side. When opening the handle unit 1050 with respect to the clincher unit 1010 and the like, the guide portion 1540 restricts a rotating locus of the handle unit 1050. When closing the handle unit 1050 with respect to the clincher unit 1010 and the like, the guide portion 1540 guides an open side of the cam groove 1056 of the handle unit 1050 separating from the camshaft 1060 to the camshaft 1060.

[Description of Variable Boosting Mechanism]

Subsequently, the variable boosting mechanism of the stapler 1100A according to the present embodiment is described with reference to FIGS. 20 and 21, and the like. Note that, the side surface parts 1522 and 1524 of the handle arm 1052 are bilaterally symmetrical and have a common configuration. Therefore, in the below, for simple descriptions, only one side surface part 1522 is described.

In the present embodiment, the handle arm 1052 can be regarded as a rotation operation when the handle arm 1052 is moved, due to a locus on which the boosting pin 1064 can move as the force is applied to the front end-side of the handle unit 1050 and a shape of the cam groove portion 1056 guided by the camshaft 1060. In the case of this condition, a fulcrum axis O that is a virtual rotation fulcrum when displacement of the handle arm 1052 is regarded as a rotation operation is formed on the rear end-side of the handle arm 1052. The handle arm 1052 is displaced in the rotation operation about the fulcrum axis O (shown with '+' in FIG. 20) as a fulcrum, thereby pressing against the driver arm 1042 via the boosting pin 1064.

In the handle arm 1052, based on a pressing operation on the handle unit 1050, a contact angle between the cam groove 1056 and the camshaft 1060 is changed according to the rotation operation of the handle arm 1052, thereby changing a contact direction with the cam groove 1056 and the camshaft 1060 to move the fulcrum axis O of the rotation operation of the handle arm 1052.

As a means for moving the fulcrum axis O, for the cam groove 1056, three sections are set according to the contact angle with the camshaft 1060 during the rotation operation of the handle arm 1052. More specifically, the cam groove 1056 has a predetermined long hole shape where three sections of a first section 1056(1001), a second section 1056(1002) and a third section 1056(1003) are combined.

The first section 1056(1001) of the cam groove 1056 is a section that is in contact with the camshaft 1060 when the stapler 1100A is in the standby state, is positioned at a lower end portion of the cam groove 1056, and is inclined in a direction in which the contact angle with the camshaft 1060 is substantially orthogonal to the horizontal direction.

The second section 1056(1002) of the cam groove 1056 is a section that is in contact with the camshaft 1060 when the stapler 1100A is switched from the standby state to a boosting state and is continuous to an upper side of the first section 1056(1001), and the contact angle with the camshaft 1060 is slightly inclined in the horizontal direction with respect to the first section 1056(1001).

The third section 1056(1003) of the cam groove 1056 is a section that is in contact with the camshaft 1060 when a clinch operation of the stapler 1100A is completed and is continuous to an upper side of the second section 1056 (1002), and the contact angle with the camshaft 1060 is further inclined in the horizontal direction than the second section 1056(1002).

The boosting pin 1064 is provided in front of the fulcrum pin 1062 for supporting the driver arm 1042. The locus on which the boosting pin 1064 can move is an arc whose center is the fulcrum pin 1062.

By the above configuration, as shown in FIG. 20, in the stapler 1100A, the front end-side of the handle unit 1050 becomes a force point E1 to which force is applied by the operator, the boosting pin 1064, which is the connecting portion of the driver arm 42 and the handle arm 1052, becomes an action point E2 of force to the driver arm 1042, and the fulcrum axis O becomes a fulcrum of the rotation operation.

Also, in the stapler 1100A, the boosting pin 1064, which is a connecting portion of the driver arm 1042 and the handle arm 1052, becomes a force point E3 to which force is applied by the handle arm 1052, the driver 1044 becomes an action point E4 of force to the staple, and the fulcrum pin 1062 becomes a fulcrum of the rotation operation.

The handle unit 1050 and the driver unit 1040 implement a variable boosting mechanism for reducing a load F applied to the handle arm 1052 by ratios of distances between the force points and action points and the fulcrums in the handle arm 1052 and the driver arm 1042. The rate D(%) of decrease in load F applied to the handle arm 1052 is obtained by the following equation (1).

[Formula 1]

$$D\ (\%) = 1 - \left(\frac{L_{14}}{L_{13}} \times \frac{L_{12}}{L_{11}}\right) \quad (1)$$

Here, as shown in FIG. 20, in the handle unit 1050, a length from the force point E1 at which force is applied to the handle arm 1052 to the fulcrum axis O becoming a rotation fulcrum of the handle arm 1052 is denoted as L11, and a length from the boosting pin 1064 becoming the action point E2 at which force is applied to the driver arm 1042 to the fulcrum axis O is denoted as L12.

Also, in the driver unit 1040, a length from the boosting pin 1064 becoming the force point E3 at which force is applied to the driver arm 1042 to the fulcrum pin 1062 becoming a rotation fulcrum of the driver arm 1042 is denoted as L13, and a length from the driver 44 becoming the action point E4 to the fulcrum pin 1062 is denoted as L14.

In the equation (1), when a ratio of the length L12 from the boosting pin 1064 becoming the action point E2 to the fulcrum axis O to the length L11 from the force point E1 to the fulcrum axis O is reduced, the rate of decrease in load F that is applied to the handle arm 1052 increases.

In the stapler 1100A of the present embodiment, the cam groove 1056 is configured to have a long hole shape having the three sections, so that the fulcrum axis O of the handle arm 1052 is moved from the vicinity of the fulcrum pin 1062 toward the boosting pin 1064 according to the position of the handle arm 1052 in the operation of binding the sheet bundle. Thereby, in the first section 1056(1001) in which the operation of sandwiching the sheet bundle between the clincher arm 1012 and the magazine unit 1020 is performed, a moving amount of the handle arm 1052 and a moving amount of the driver arm 1042 are close to each other. For this reason, the rate of decrease in load is reduced but an increase in operating amount of the handle unit 1052 is suppressed. On the other hand, in the second section 1056 (1002) and the third section 1056(1003) in which the operation of causing the staple to penetrate through and to bind the sheet bundle is performed, the moving amount of the handle arm 1052 increases, but the rate of decrease in load increases, so that the load applied to the handle arm 1052 is reduced. In this way, in a desired process of the operation of binding the sheet bundle, the load F that is applied to the handle arm 1052 is stepwise reduced so that the load F is adjusted according to the operation, thereby reducing the load F in a step where the staple penetrates through the sheet bundle.

[Holding Portion 1123*a*]

When the variable boosting mechanism is adopted for the stapler 1100A as described above, the cam groove 1056 of the handle arm 1052 slides with contacting the camshaft 1060 each time the binding processing is performed, so that a surface pressure between the cam groove 1056 and the camshaft 1060 increases and a high load is applied to the bearing part 1122. Here, in the stapler of the related art, since the diameter of the camshaft 1060 and the diameter of the shaft hole 1122*a* are selected to be substantially the same, an amount of grease that can be applied into a gap between the camshaft 1060 and the shaft hole 1122*a* may be limited to a certain amount. For this reason, when the amount of greases is reduced as the stapler 1100A is repeatedly used, the poor sliding is caused on the cam groove 1056.

Therefore, in the present embodiment, at the periphery of the shaft hole 1122*a*, the holding portion 1123*a* for storing grease for reducing friction between the cam groove 1056 and the camshaft 1060 is provided to suppress occurrence of poor sliding between the cam groove 1056 and the camshaft 1060.

Figure 25A:
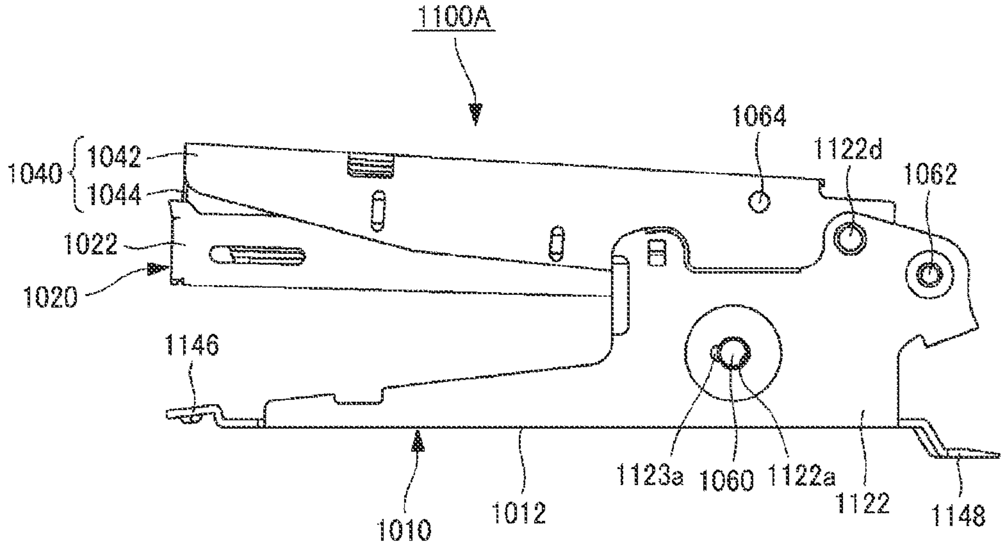
FIG. 25A is a side view of the stapler having a holding portion.
Figure 25B:
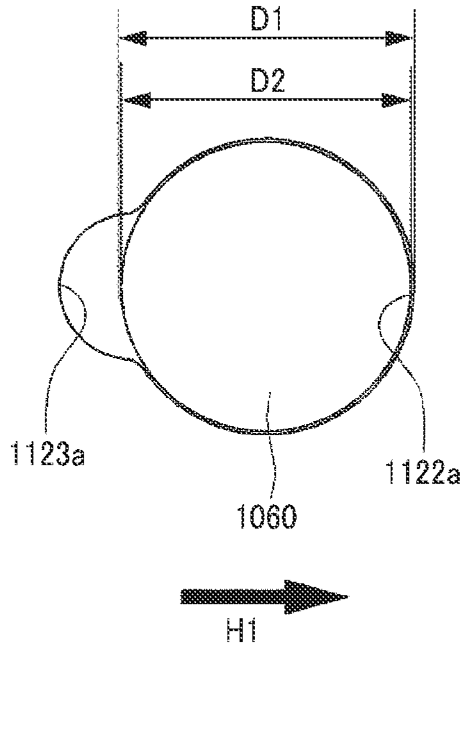
FIG. 25B is an enlarged view of a main part of the holding portion.
Figure 26:
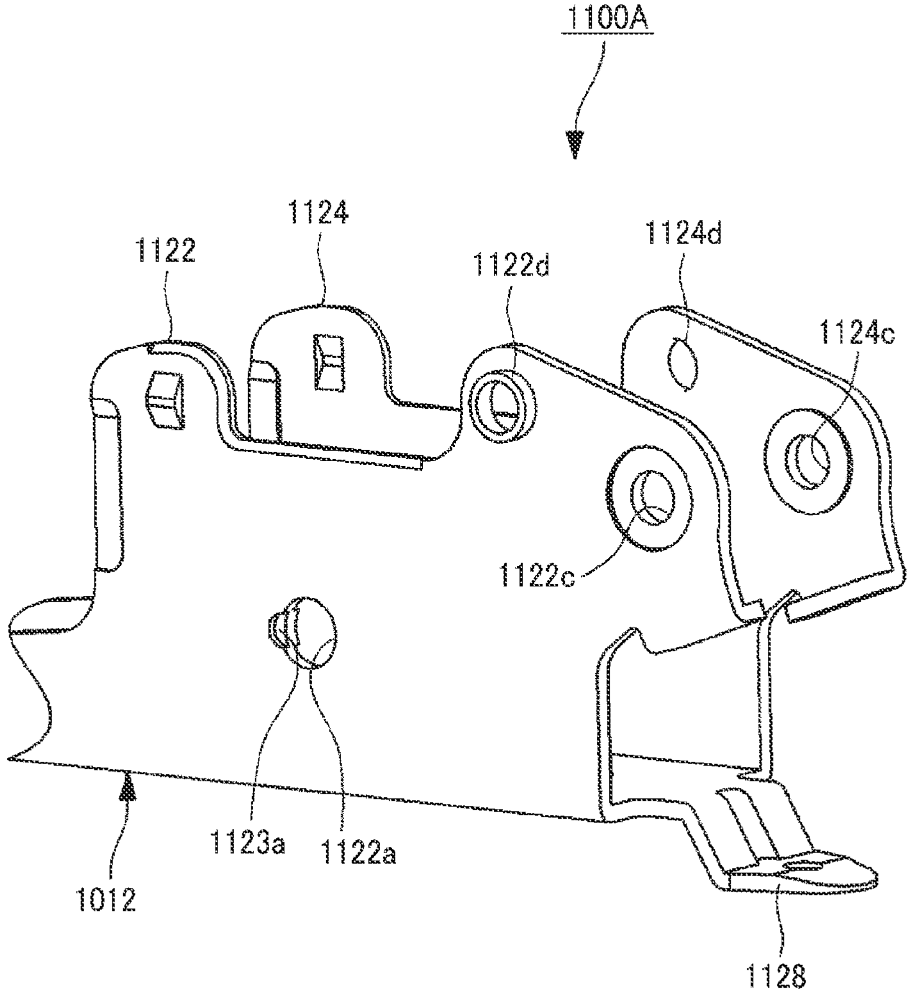
FIG. 26 is a perspective view of a bearing part.

FIG. 25A is a side view of the stapler 1100A, and FIG. 25B is an enlarged view of a main part of the holding portion 1123*a*. FIG. 26 is a perspective view of the bearing part 1122 including the holding portion 1123*a*. Note that, a diameter D1 of the shaft hole 1122*a* and a diameter D2 of the camshaft 1060 are substantially the same. Note that, in the present embodiment, although not shown in FIGS. 25A and 26, and the like, the bearing part 1124 facing the bearing part 1122 is also provided with the holding portion 1125*a*. Since the holding portion 1125*a* on the bearing part 1124-side have a function and a configuration similar to the holding portion 1123*a* on the bearing part 1122-side, the detailed descriptions thereof are omitted.

The holding portion 1123*a* is a part of the periphery of the shaft hole 1122*a*, and is provided on an opposite side to a direction H1 in which the camshaft 1060 is abutted against the shaft hole 1122*a* by the cam groove 1056 by the load upon sliding of the handle arm 1052. Thereby, since an area of the shaft hole 1122*a* on the side against which the camshaft 1060 is abutted can be secured, the grease can be stored near the shaft hole 1122*a* without affecting the surface pressure between the camshaft 1060 and the shaft hole 1122*a*. In addition, the holding portion 1123*a* is formed to have a concave shape cut into a substantially semicircular shape from a peripheral edge portion of the shaft hole 1122*a* toward the clincher groove portion 1126 (front) in a radial direction, as seen from above.

Note that, the size of the holding portion 1123*a* can be arbitrarily designed according to an amount of grease to be held. Also, the shape of the holding portion 1123*a* is not limited to the semicircular shape, as seen from above, and may be, for example, a rectangular shape. In addition, a configuration where only one of the holding portions 1123*a* and 1125*a* is provided may be possible or two may be provided. Further, although the holding portion 1123*a* is formed by recessing at least a part of the outer surface of the bearing part 1122, the holding portion 1123*a* may also be formed to penetrate through the bearing part 1122 in the thickness direction (right and left direction).

[Example of Operations of Stapler 1100A]

Figure 27:
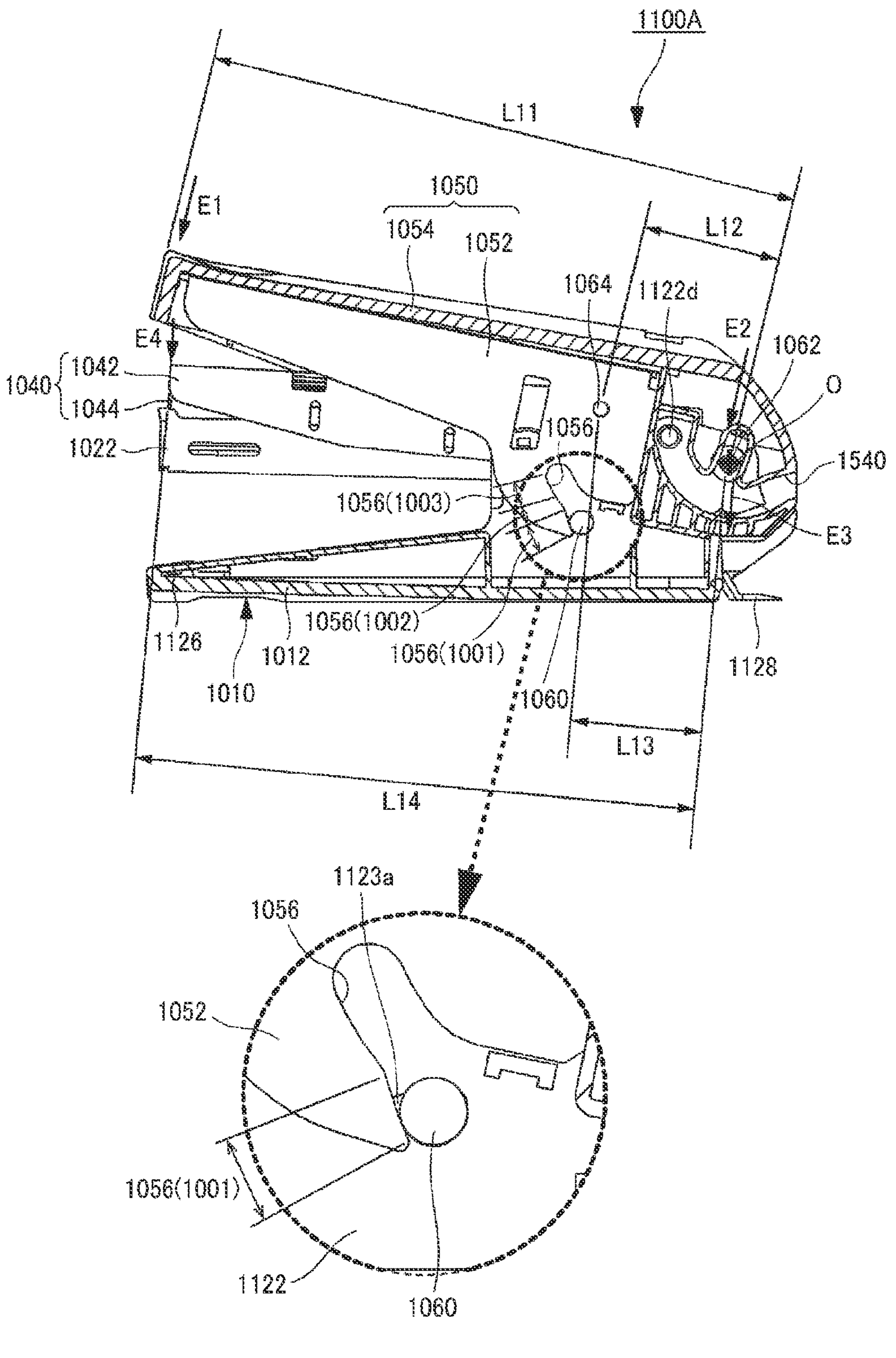
FIG. 27 shows an operation of the stapler (1 thereof).
Figure 28:
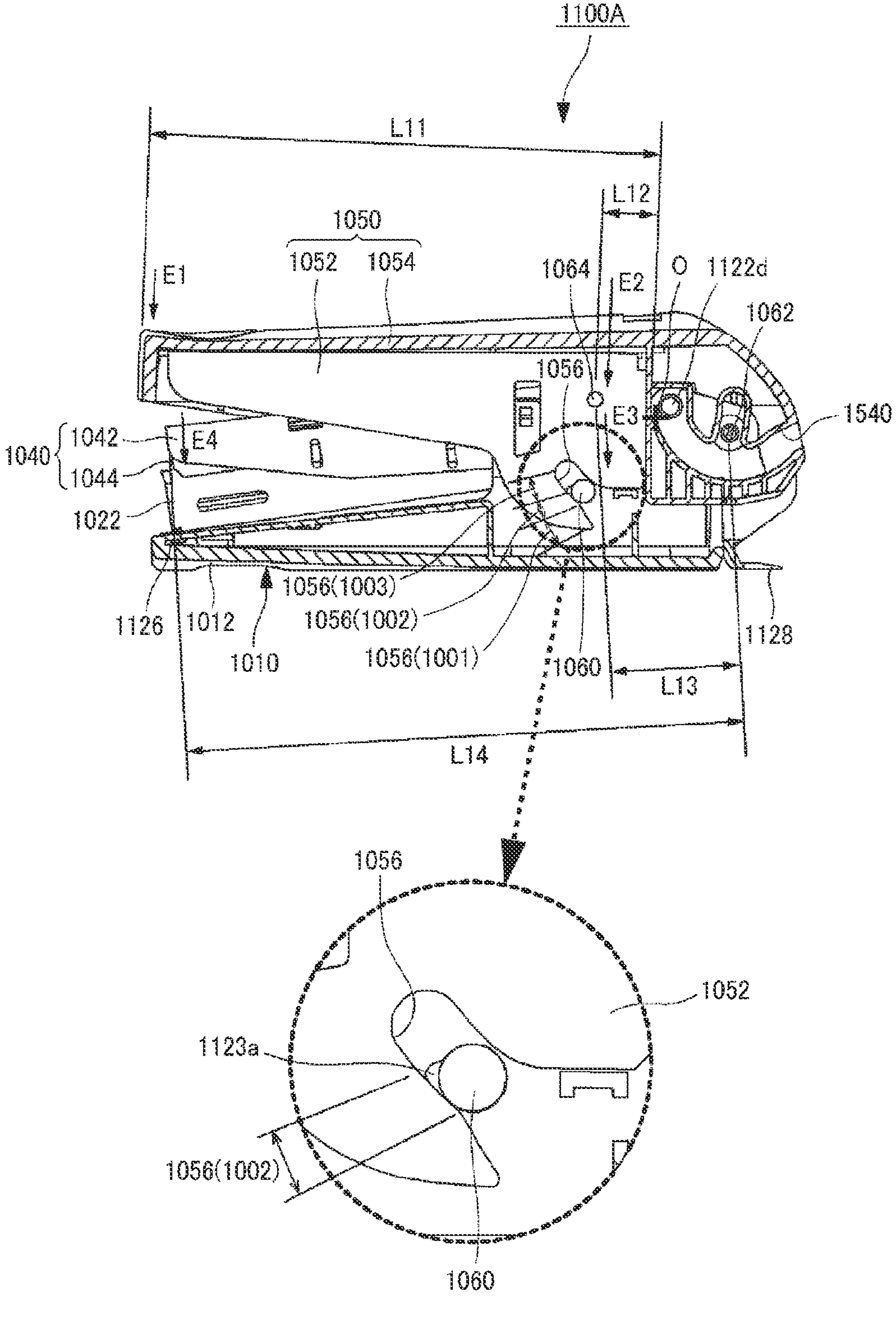
FIG. 28 shows the operation of the stapler (2 thereof).
Figure 29:
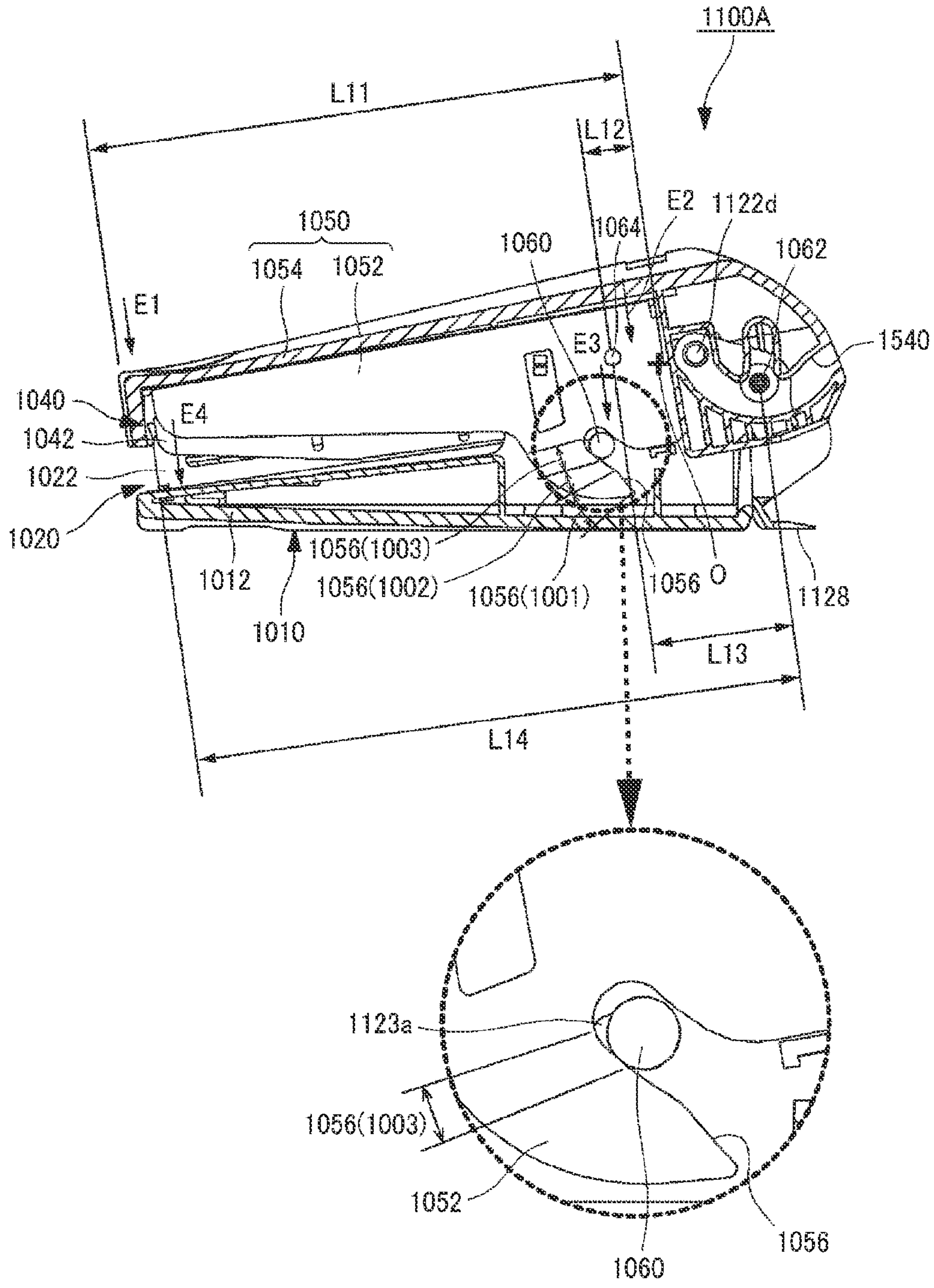
FIG. 29 shows the operation of the stapler (3 thereof).

FIGS. 27 to 29 show an example of operations of the stapler 1100A according to the present embodiment. Note that, in the present embodiment, for example, in an assembling step of the manufacturing method of the stapler 1100A, the grease is applied to the holding portion 1123*a* in advance, and a certain amount of grease is stored in the holding portion 1123*a*. Then, the stapler 1100A that has been assembled is sold to an operator. Note that, the application timing of the grease is not limited to the manufacturing step. For example, the grease may be applied after the stapler 1100A is sold.

As shown in FIG. 27, when the stapler 1100A is in the standby state, the cam groove 1056 of the handle arm 1052 is in contact with the camshaft 1060 in the first section 1056(1001). In the state where the cam groove 1056 of the handle arm 1052 is in contact with the camshaft 1060 in the first section 1056(1001), the handle arm 1052 can be regarded as a rotation operation when the handle arm 1052 is slightly moved. For this reason, the fulcrum axis O becoming a virtual rotation fulcrum of the handle arm 1052 is formed near the fulcrum pin 1062 becoming a rotation fulcrum of the driver arm 1042.

In the standby state, a sheet bundle (not shown) is placed on the clincher arm 1012 by the operator.

When the handle cover 1054 is pushed in the standby state by the operator, the cam groove 1056 is guided by the camshaft 1060, so that the handle arm 1052 and the handle cover 1054 are displaced by the rotation operation about the fulcrum axis O as a fulcrum formed near the fulcrum pin 1062, and the contact portion of the cam groove 1056 with the camshaft 1060 is moved.

When the handle arm 1052 is rotated as a result of pushing the handle cover 1054, the position of the boosting pin 1064 is accordingly displaced. Thereby, the driver arm 1042 connected to the handle arm 1052 via the boosting pin 1064 is pressed, so that both the driver arm 1042 and the magazine unit 1020 are rotated about the fulcrum pin 1062 as a fulcrum.

As the magazine unit 1020 is rotated, the sheet bundle (not shown) consisting of a predetermined number of sheets is sandwiched between the clincher unit 1010 and the magazine 1022. Also, as shown in FIG. 28, the cam groove 1056 of the handle arm 1052 is contacted to the camshaft 1060 in the second section 1056(1002). The grease exudes from the holding portion 1123*a* all the time, and the exuded grease is supplied to the edge portion of the shaft hole 1122*a* and to the peripheral surface of the camshaft 1060.

In the second section 1056(1002) of the cam groove 1056, the contact angle with the camshaft 1060 changes smaller by rotation of the handle arm 1052, as compared to the first section 1056(1001). Thereby, the fulcrum axis O of the handle arm 1052 is moved from the vicinity of the fulcrum pin 1062 toward the boosting pin 1064.

When the fulcrum axis O of the handle arm 1052 is moved from the vicinity of the fulcrum pin 1062 toward the boosting pin 1064, the length L11 from the force point E1 to the fulcrum axis O and the length L12 from the boosting pin 1064 becoming the action point E2 to the fulcrum axis O are reduced (refer to FIG. 28). For this reason, w % ben the load F is calculated by substituting the lengths L11 and L12 into the equation (1), the rate of decrease in load F that is applied to the handle arm 1052 increases and the load F is gradually reduced.

When the handle cover 1054 is further pressed from the state where the sheet bundle is sandwiched, the driver arm 1042 is pressed due to displacement of the boosting pin 1064 by the rotation operation of the handle arm 1052. At this time, the driver arm 1042 rotates about the fulcrum pin 1062 as a fulcrum in a state where the rotation of the magazine 1022 is restricted. The rotation of the driver arm 1042 presses the connection staple against the driver 1044, so that one staple is separated. The staple separated into one piece is struck out from the striking-out opening 1200 and penetrates through a sheet bundle P (not shown).

Continuously, when the handle cover 1054 is further pressed and the handle arm 1052 is thus rotated to a position in which the staple penetrates through the sheet bundle, the cam groove 1056 of the handle arm 1052 is contacted to the camshaft 1060 in the third section 1056(1003), as shown in FIG. 29. When a contact portion between the cam groove 1056 and the camshaft 1060 is moved from the second section 1056(1002) to the third section 1056(1003), the fulcrum axis O is moved toward the boosting pin 1064 beyond the midpoint between the fulcrum pin 1062 and the boosting pin 1064. Also in this case, the grease exudes from the holding portion 1123*a*, and the exuded grease is supplied to the edge portion of the shaft hole 1122*a* and to the peripheral surface of the camshaft 1060.

When the fulcrum axis O of the handle arm 1052 is moved toward the boosting pin 1064, the length L11 from the force point E1 to the fulcrum axis O and the length L12 from the boosting pin 1064 becoming the action point E2 to the fulcrum axis O are further reduced (refer to FIG. 29). When the load F is calculated by substituting the lengths L11 and L12 into the equation (1), the rate of decrease in load F that is applied to the handle arm 1052 further increases and the load F is reduced to a desired value.

Continuously, when the handle cover 1054 is further pressed by the operator, the driver arm 1042 is pressed by displacement of the boosting pin 1064 due to the rotation operation of the handle arm 1052, and the driver arm 1042 further rotates about the fulcrum pin 1062 as a fulcrum in a state where the rotation of the magazine 1022 is restricted. When the tip end portions of the leg portions of the staple accordingly protrude from the backside of the sheet bundle, the leg portions are inwardly bent by the clincher groove portion 1126, so that the sheet bundle is bound by the staple.

In this state, the third section 1056(1003) of the cam groove 1056 is guided by the camshaft 1060 and thus rotates about the fulcrum axis O as a fulcrum formed closer to the boosting pin 1064 than the midpoint between the fulcrum pin 1062 and the boosting pin 1064. Here, the third section 1056(1003) of the cam groove 1056 has a center of the arc matched with the fulcrum axis O, so that when the third section 1056(1003) is guided by the camshaft 1060, the fulcrum axis O is not moved.

Thereby, the length L11 from the force point E1 to the fulcrum axis O and the length L12 from the boosting pin 1064 becoming the action point E2 to the fulcrum axis O do not change. Therefore, from the equation (1), the rate of decrease in load F that is applied to the handle arm 1052 is constant and the load F reduced to the desired value is maintained.

As described above, according to the present embodiment, since the holding portion 1123*a* for storing the grease is provided at the periphery of the shaft hole 1122*a*, the grease can be supplied to the shaft hole 1122*a* and the camshaft 1060. For this reason, even when the number of binding times increases, since the grease is supplied from the holding portion 1123*a* to the camshaft 1060 and the like all the time, it is possible to prevent the poor sliding between the cam groove 1056 of the handle arm 1052 and the camshaft 1060, and to smoothly maintain the sliding of the cam groove 1056. Thereby, it is possible to increase the number of durability even in the stapler 1100A having the variable boosting mechanism where the high load is applied to the camshaft 1060 and the like.

First Modified Embodiment

Subsequently, a holding portion 1123*b* that is a first modified embodiment of the holding portion 1123*a* for storing the grease is described. Note that, since a stapler 1100B according to the first modified embodiment has a configuration and a function similar to the stapler 1100A of the above embodiment, the common configurations are denoted with the same reference signs and the detailed descriptions are omitted or simplified.

Figure 30A:
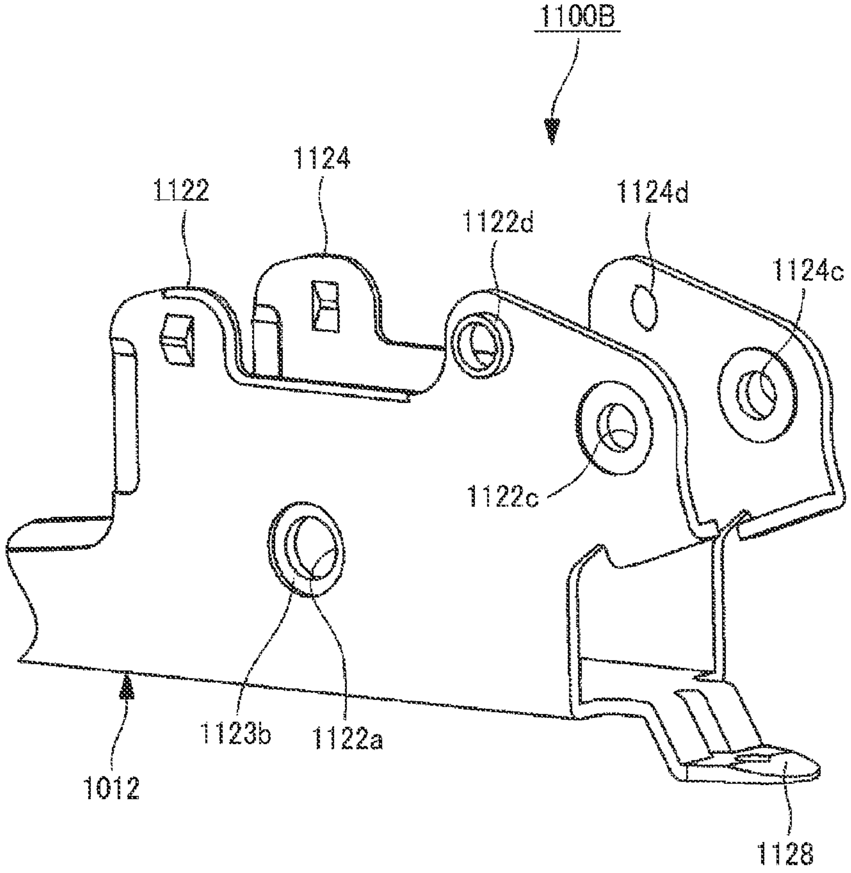
FIG. 30A is a perspective view of a bearing part according to a first modified embodiment of the second embodiment of the present invention.
Figure 30B:
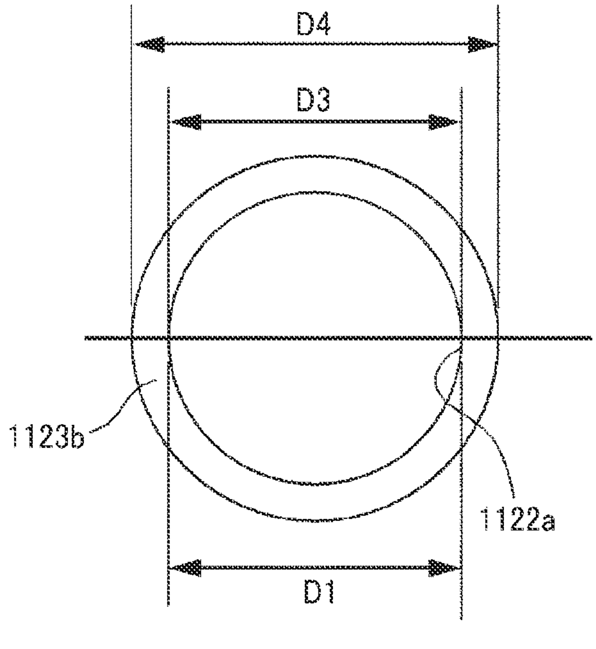
FIG. 30B is an enlarged view of a main part of a holding portion according to the first modified embodiment.

FIG. 30A is a perspective view of the bearing part 1122 having a holding portion 1123*b* according to the first modified embodiment, and FIG. 30B is an enlarged view of a main part of the holding portion 1123*b* according to the first modified embodiment.

The holding portion 1123*b* is formed by cutting the peripheral edge portion of the shaft hole 1122*a* in the outer surface, which faces the cam groove 1056 of the handle arm 1052, of the bearing part 1122 into a step shape over the entire circumference of the shaft hole. An inner diameter D3 of the holding portion 1123*b* is selected to be substantially the same as the diameter D1 of the shaft hole 1122*a*, and an outer diameter D4 of the holding portion 1123*b* is selected to be slightly greater than the diameter D1 of the shaft hole 1122*a*. In this way, the holding portion 1123*b* is configured as an annular groove (concave portion), as seen from above, which does not penetrate through the bearing part 1122 in the thickness direction.

Note that, the depth of the holding portion 1123*b* in the thickness direction, and the outer diameter D4 of the holding portion 1123*b* can be arbitrarily set according to the amount of grease to be stored. Also, the outer shape of the holding portion 1123*b* is an annular shape of a true circle but may also be an annular shape of an ellipse or a rectangular shape. Further, although the example where the holding portion 1123*b* is provided over the entire circumference of the shaft hole 1122*a* has been described, the holding portion 1123*b* may be provided on a circumferential portion of the shaft hole 1122*a*

As described above, according to the first modified embodiment, like the above embodiment, since the holding portion 1123*b* for storing the grease is provided, the grease can be supplied to the shaft hole 1122*a* and the camshaft 1060 all the time. Thereby, it is possible to prevent the poor sliding between the cam groove 1056 of the handle arm 1052 and the camshaft 1060, and to smoothly maintain the sliding of the handle arm 1052 having the cam groove 1056. As a result, it is possible to increase the number of durability even in the stapler 1100B having the variable boosting mechanism where the high load is applied to the camshaft 1060 and the like.

Second Modified Embodiment

Subsequently, a holding portion 1123*c* that is a second modified embodiment of the holding portion 1123*a* for storing the grease is described. Note that, since a stapler 1100C according to the second modified embodiment has a configuration and a function similar to the stapler 1100A of the above embodiment, the common configurations are denoted with the same reference signs and the detailed descriptions are omitted or simplified.

Figure 31A:
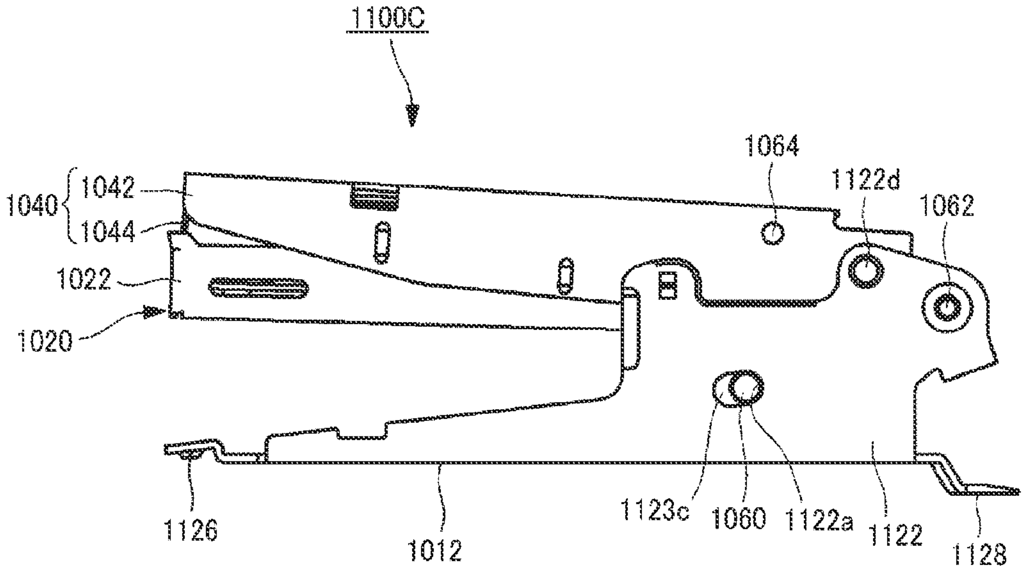
FIG. 31A is a side view of a stapler according to a second modified embodiment of the second embodiment of the present invention.
Figure 31B:
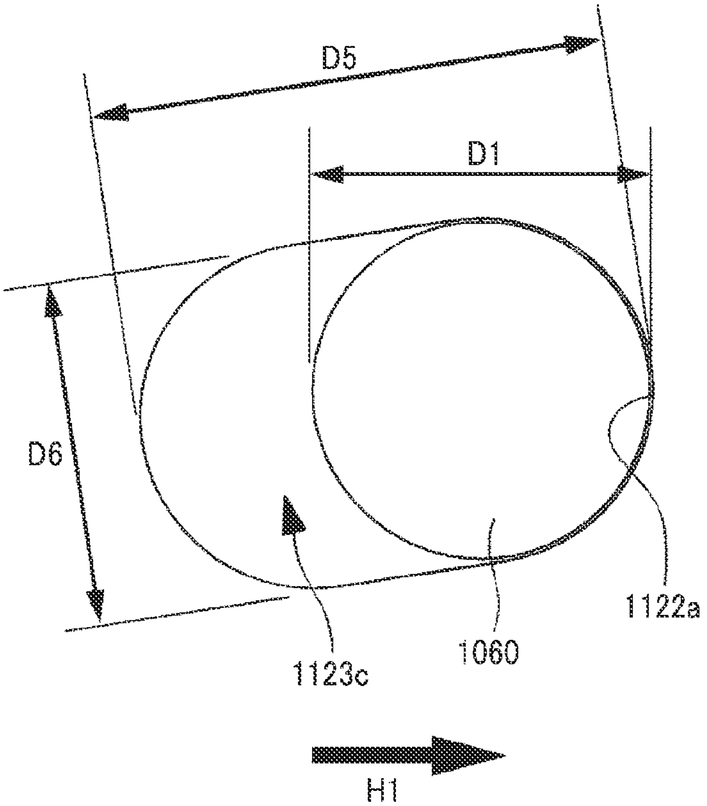
FIG. 31B is an enlarged view of a main part of a holding portion according to the second modified embodiment.

FIG. 31A is a side view of a stapler 1100C having a holding portion 1123*c* according to the second modified embodiment, and FIG. 31B is an enlarged view of a main part of the holding portion 1123*c*.

The holding portion 1123*c* is provided at a part of the periphery of the shaft hole 1122*a*, and is formed by enlarging an opposite side to the direction H1, in which the cam groove 1056 of the shaft hole 1122*a* is abutted, toward the clincher groove portion 1126 (front) in the radial direction. More specifically, the holding portion 1123*c* is constituted by a hole portion excluding the shaft hole 1122*a* (camshaft 1060) from an elliptical hole having a long side D5 and a short side D6 and including the shaft hole 1122*a*.

As described above, according to the second modified embodiment, like the above embodiment, since the holding portion 1123*c* for storing the grease is provided, the grease can be supplied to the shaft hole 1122*a* and the camshaft 1060 all the time. Thereby, it is possible to prevent the poor sliding between the cam groove 1056 of the handle arm 1052 and the camshaft 1060, and to smoothly maintain the sliding of the handle arm 1052 having the cam groove 1056. As a result, it is possible to increase the number of durability even in the stapler 1100C having the variable boosting mechanism where the high load is applied to the camshaft 1060 and the like.

Third Modified Embodiment

Subsequently, a holding portion 1123*d* that is a third modified embodiment of the holding portion 1123*a* for storing the grease is described. Note that, since a stapler 1100D according to the third modified embodiment has a configuration and a function similar to the stapler 1100A of the above embodiment, the common configurations are denoted with the same reference signs and the detailed descriptions are omitted or simplified.

Figure 32A:
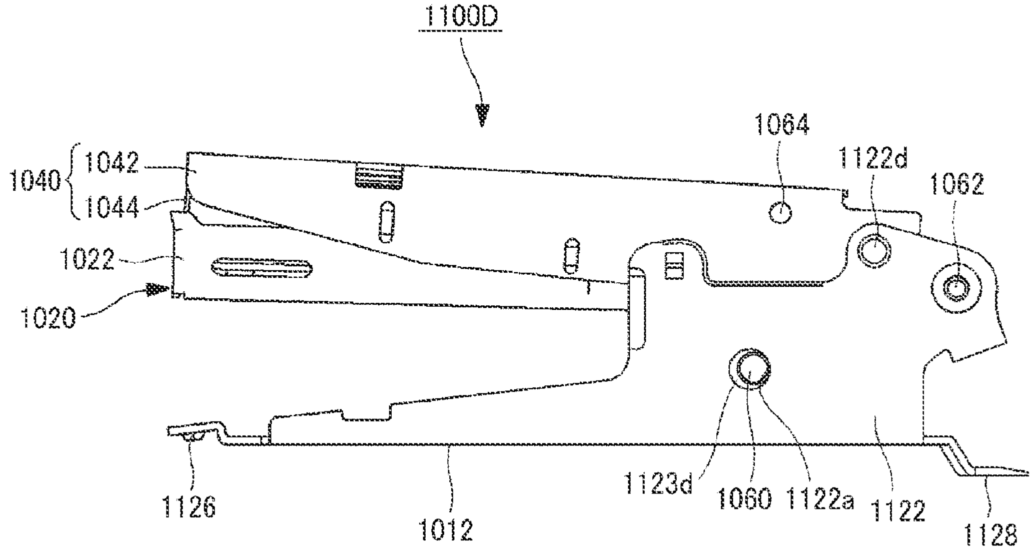
FIG. 32A is a side view of a stapler according to a third modified embodiment of the second embodiment of the present invention.
Figure 32B:
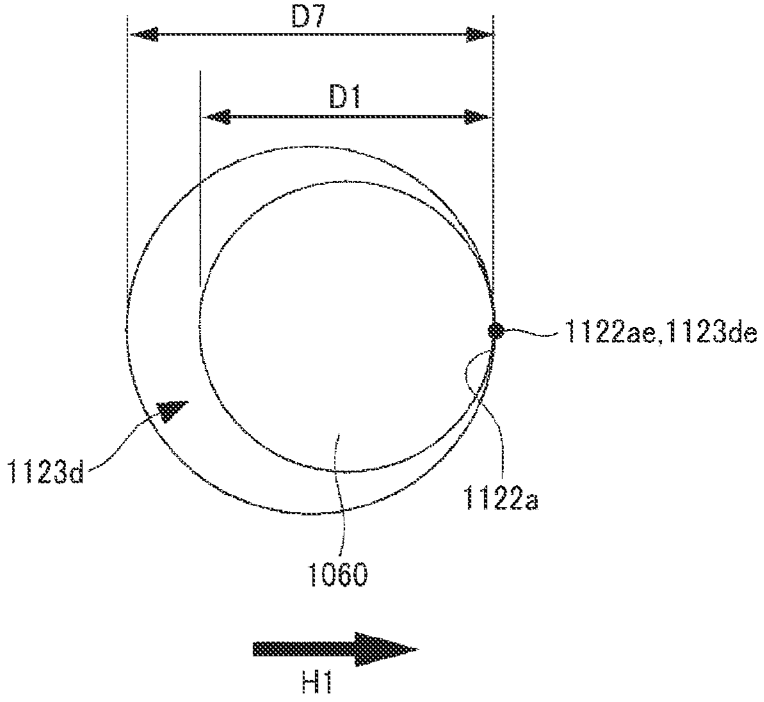
FIG. 32B is an enlarged view of a main part of a holding portion according to the third modified embodiment.

FIG. 32A is a perspective view of a stapler 1100D having a holding portion 1123*d* according to the third modified embodiment, and FIG. 32B is a plan view of the holding portion 1123*d* according to the third modified embodiment.

The holding portion 1123*d* is provided at a portion of the periphery of the shaft hole 1122*a*, and is constituted by a hole portion formed by enlarging an opposite side to the direction H1, in which the cam groove 1056 of the shaft hole 1122*a* is abutted, toward the clincher groove portion 1126 (front) in the radial direction. More specifically, in a case where a diameter D7 of the holding portion 1123*d* is set greater than the diameter D1 of the shaft hole 1122*a* and an edge portion 1123*de* of the holding portion 1123*d* in the direction H1 and an edge portion 1122*ae* of the shaft hole 1122*a* in the direction H1 are overlapped, the holding portion 1123*d* is constituted by a hole portion excluding the shaft hole 1122*a*.

As described above, according to the third modified embodiment, like the above embodiment, since the holding portion 1123*d* for storing the grease is provided, the grease can be supplied to the shaft hole 1122*a* and the camshaft 1060 all the time. Thereby, it is possible to prevent the poor sliding between the cam groove 1056 of the handle arm 1052 and the camshaft 1060, and to smoothly maintain the sliding of the cam groove 1056. As a result, it is possible to increase the number of durability even in the stapler 1100D having the variable boosting mechanism where the high load is applied to the camshaft 1060 and the like.

Note that, the technical scope of the present invention is not limited to the above embodiments, and includes a variety of changes made to the above embodiments without departing from the gist of the present invention. For example, in order to prevent the poor sliding between the cam groove 1056 of the handle arm 1052 and the camshaft 1060, the holding portion 1123*a* is provided at the periphery of the shaft hole 1122*a* of the bearing part 1122. However, the present invention is not limited thereto. For example, the shaft holes 1122*c* and 1124*c* and the like of the bearing part 1122 may be provided with the holding portions for storing grease to prevent poor sliding between the fulcrum pin 1062 and the handle cover 1054 and the like. In the above embodiments, as the means for implementing the variable boosting mechanism, the cam groove 1056 is constituted by the three sections of the first section 1056(1001), the second section 1056(1002) and the third section 1056(1003). However, the present invention is not limited thereto. For example, the cam groove 1056 may also be constituted by two sections of the first section 1056(1001) and the second section 1056(1002). In this case, for example, the third section 1056(1003) is constituted as the second section 1056(1002)

The present specification describes at least the following inventions.

(1) A stapler including:

a clincher unit having a clincher part configured to bend leg portions of a staple and provided on one end portion-side;

a magazine unit having a magazine in which a staple bundle consisting of staples connected to each other is loaded, and supported on the other end portion-side of the clincher unit to be rotatable about a fulcrum shaft portion as a fulcrum with respect to the clincher unit a driver unit having a driver configured to strike out a staple from the magazine and provided on one end portion-side, the other end portion-side of the driver unit being supported to be rotatable about the fulcrum shaft portion as a fulcrum with respect to the clincher unit;

a handle unit connected to the driver unit by a transmission shaft portion provided between the fulcrum shaft portion and the driver, and configured to move the driver unit toward the clincher unit for opening and closing;

a camshaft portion provided to any one of the clincher unit and the handle unit;

a cam groove portion provided to the other of the clincher unit and the handle unit, configured to permit the camshaft portion to enter, and having one open end portion in a direction, in which the clincher unit and the handle unit separate from each other, to enable the camshaft portion to be inserted/pulled out; and a guide portion configured to restrict a movement path of the handle unit with respect to the clincher unit in operations of opening and closing the handle unit and the driver unit with respect to the clincher unit and the magazine unit.

(2) The stapler according to the above (1), wherein in an operation of opening the handle unit and the driver unit with respect to the clincher unit and the magazine unit, the camshaft portion separates from the cam groove portion, and wherein in an operation of closing the handle unit and the driver unit with respect to the clincher unit and the magazine unit, the movement path of the handle unit with respect to the clincher unit is restricted by the guide portion and the camshaft portion enters the cam groove portion.

(3) The stapler according to the above (1) or (2), wherein the guide portion has a guide convex portion provided to any one of the clincher unit and the handle unit and a guide concave portion provided to the other of the clincher unit and the handle unit and configured to permit the guide convex portion to enter.

(4) A stapler including:

a clincher unit having a clincher part configured to bend leg portions of a staple and provided on one end portion-side;

a magazine unit having a magazine in which a staple bundle consisting of staples connected to each other is loaded, and supported on the other end portion-side of the clincher unit to be rotatable about a fulcrum shaft portion as a fulcrum with respect to the clincher unit;

a driver unit having a driver configured to strike out a staple from the magazine and provided on one end portion-side, the other end portion-side of the driver unit being supported to be rotatable about the fulcrum shaft portion as a fulcrum with respect to the clincher unit; and a handle unit connected to the driver unit by a transmission shaft portion provided between the fulcrum shaft portion and the driver, and configured to move the driver unit toward the clincher unit for opening and closing;

wherein the magazine unit has:

a pusher provided to be movable along a length direction of the magazine.

a pusher spring for pressing the pusher toward a magazine front wall part of the magazine, and a pusher band having one end portion attached to the pusher and the other end portion attached to the driver unit, and configured to connect the pusher and the driver unit, and wherein in a state where the pusher is retreated by the pusher band and is moved to a most retreat position in an operation of opening the handle unit and the driver unit with respect to the clincher unit and the magazine unit, a length between an inner surface-side of the magazine front wall part and the pusher is 75 mm or longer, a length of the magazine is 90 mm or longer and 100 mm or shorter, a length of the pusher band is 51 mm or longer and 61 mm or shorter, a length from the fulcrum shaft portion to an attachment position of the pusher band to the driver unit is 41 mm or longer and 50 mm or shorter, and an entire length of the stapler is 105 mm or longer and 125 mm or shorter.

(5) The stapler according to the above (4), further comprising:

a camshaft portion provided to any one of the clincher unit and the handle unit; and a cam groove portion provided to the other of the clincher unit and the handle unit, configured to permit the camshaft portion to enter, and having one open end portion in a direction, in which the clincher unit and the handle unit separate from each other, to enable the camshaft portion to be inserted/pulled out.

(6) The stapler according to the above (4) or (5), wherein a ratio of the length of the magazine 30 and the length of the pusher band is 10:5.7 to 6.1, and wherein a ratio of the length of the magazine 30 and the length from the fulcrum shaft portion to the attachment position of the pusher band to the driver unit is 10:4.6 to 5.0.

(7) A stapler including:

an operating member configured to be displaced by receiving force from an operator;

a clincher unit having a clincher groove configured to bend leg portions of a staple and provided at a front end portion; and a shaft portion supported in a hole portion provided to the clincher unit, and configured to support the operating member, wherein the hole portion has a holding portion for storing lubricant for reducing friction between the shaft portion and the operating member.

(8) The stapler according to the above (7), wherein the holding portion is provided at at least a portion of a periphery of the hole portion.

(9) The stapler according to the above (8), wherein the holding portion is provided to have a concave portion shape in a radial direction of the hole portion.

(10) The stapler according to the above (8) or (9), wherein the holding portion is provided in an opposite direction to a direction in which the shaft portion is abutted by a load of the operating member.

(11) The stapler according to one of the above (7) to (10), further including:

a driver unit having a driver connected to the operating member via a connecting portion and configured to separate staples loaded in the loading part into one staple and to strike out the same, and configured to be displaced in a rotation operation by receiving force of the operating member at the connecting portion; and a magazine unit in which staples are loaded, wherein the clincher unit is configured to rotatably support the driver unit and the magazine unit at a rear end portion, wherein the operating member has a guide portion that is slidably engaged with the shaft portion, and wherein a length from a force receiving portion to a fulcrum axis of a rotation operation, and a length from a force acting portion to the fulcrum axis are changed by moving the fulcrum axis according to an operation on the operating member, thereby changing a rate of decrease in load that is applied to the operating member.

(12) The stapler according to the above (8), wherein the holding portion is provided to have a step shape on a peripheral surface of the hole portion.

(13) The stapler according to the above (8), wherein the holding portion is provided by enlarging a circumferential portion of the hole portion in a radial direction.

The subject application is based on Japanese Patent Application Nos. 2019-005955 filed on Jan. 17, 2019 and 2019-005956 filed on Jan. 17, 2019, the contents of which are incorporated herein for reference.

REFERENCE SIGNS LIST

1A: stapler
2: clincher unit
20: clincher arm
20*a*: clincher part
20*b*: bottom surface part
20*c* sidewall part
20*d*: fulcrum pin support portion
20*e*: camshaft support portion
20*f*: restriction convex portion
20*g*: guide convex portion (guide portion)
21: clincher arm cover
22: fulcrum pin (fulcrum shaft portion)
23: camshaft (camshaft portion)
3: magazine unit
30: magazine
30*a*: magazine sidewall part
30*b*: magazine front wall part
30*c*: opening portion
30*d*: fulcrum pin support portion
31: pusher
31*a*: pressing portion
31*b*: pusher spring engaging portion
32: pusher guide
32*a*: staple guide portion
32*b*: pusher spring guide portion
32*c*: pusher spring engaging portion
32*d*: restriction portion
33: pusher spring
34: pusher band
35: magazine return spring
4: driver unit
40: driver arm
40*a*: top surface part
40*b* sidewall part
40*c*: fulcrum pin support portion
40*d*: boosting pin support portion
41: driver arm return spring
42: driver
43: staple cover
43*a*: magazine/driver engaging portion
43*b*: top surface part
43*c* sidewall parts
43*d*: fulcrum pin support portion
43*e*: opening portion
43*f*: mounting portion
5: handle unit
50: handle arm
50*a*: top surface part
50*b* sidewall part
50*c*: boosting pin support portion
50*d*: cam groove portion
50*e*: restriction concave portion
51: handle arm cover
51*a*: guide concave portion (guide portion)

51*b*: finger setting portion
6: boosting pin (transmission shaft portion)
10: staple
11: staple bundle
1010: clincher unit
1012: clincher arm
1020: magazine unit
1022: magazine
1040: driver unit
1044: driver
1050: handle unit (operating member)
1052: handle arm
1054: handle cover
1056: cam groove (guide portion)
1060: camshaft (shaft portion)
1064: boosting pin (connecting portion)
1100A, 1100B, 1100C, 1100D: stapler
1122: bearing part
1122*a*: shaft hole (hole portion)
1123*a*, 1123*b*, 1123*c*, 1123*d*: holding portion

The invention claimed is:

1. A stapler comprising:

a clincher unit having a clincher part configured to bend leg portions of a staple and provided on one end portion-side;

a magazine unit having a magazine in which a staple bundle consisting of staples connected to each other is loaded, and supported on the other end portion-side of the clincher unit to be rotatable about a fulcrum shaft portion as a fulcrum with respect to the clincher unit;

a driver unit having a driver configured to strike out a staple from the magazine and provided on one end portion-side, the other end portion-side of the driver unit being supported to be rotatable about the fulcrum shaft portion as a fulcrum with respect to the clincher unit;

a handle unit connected to the driver unit by a transmission shaft portion provided between the fulcrum shaft portion and the driver, and configured to move the driver unit toward the clincher unit for opening and closing;

a pusher provided to be movable along a length direction of the magazine, wherein:

in a state where the pusher is retreated and is moved to a most retreat position in an operation of opening the handle unit and the driver unit with respect to the clincher unit and the magazine unit:

a length between an inner surface-side of a magazine front wall part and the pusher is 75 mm or longer, and a length of the magazine is 90 mm or longer and 100 mm or shorter;

a camshaft portion provided to any one of the clincher unit and the handle unit;

a cam groove portion provided to the other of the clincher unit and the handle unit, configured to permit the camshaft portion to enter, and having one open end portion in a direction, in which the clincher unit and the handle unit separate from each other, to enable the camshaft portion to be inserted/pulled out; and a guide portion configured to restrict a movement path of the handle unit with respect to the clincher unit in operations of opening and closing the handle unit and the driver unit with respect to the clincher unit and the magazine unit, wherein a fulcrum axis of a rotation operation of the handle unit is moved as the cam groove portion is guided by the camshaft portion in accordance with the rotation operation of the handle unit, wherein the fulcrum axis is a virtual fulcrum axis when displacement of the handle unit is regarded as the rotation operation, wherein the cam groove portion has a first section and a second section, wherein, in an operation for holding a sheet between the clincher unit and the magazine unit, the first section is in contact with the cam shaft portion and the virtual fulcrum axis is at a given position proximal the fulcrum shaft portion, and wherein in an operation for causing the staple to penetrate through and to bind a sheet bundle, the second section is in contact with the cam shaft portion and the virtual fulcrum axis moves from the given position.

2. The stapler according to claim 1, wherein the cam groove portion is configured so that a contact angle with the camshaft portion changes according to the rotation operation of the handle unit.

3. The stapler according to claim 1, wherein in an operation of opening the handle unit and the driver unit with respect to the clincher unit and the magazine unit, the camshaft portion separates from the cam groove portion, and wherein in an operation of closing the handle unit and the driver unit with respect to the clincher unit and the magazine unit, the movement path of the handle unit with respect to the clincher unit is restricted by the guide portion and the camshaft portion enters the cam groove portion.

4. The stapler according to claim 1, wherein the guide portion has a guide convex portion provided to any one of the clincher unit and the handle unit and a guide concave portion provided to the other of the clincher unit and the handle unit and configured to permit the guide convex portion to enter.

5. A stapler comprising:

a clincher unit having a clincher part configured to bend leg portions of a staple and provided on one end portion-side;

a magazine unit having a magazine in which a staple bundle consisting of staples connected to each other is loaded, and supported on the other end portion-side of the clincher unit to be rotatable about a fulcrum shaft portion as a fulcrum with respect to the clincher unit;

a driver unit having a driver configured to strike out a staple from the magazine and provided on one end portion-side, the other end portion-side of the driver unit being supported to be rotatable about the fulcrum shaft portion as a fulcrum with respect to the clincher unit; and a handle unit connected to the driver unit by a transmission shaft portion provided between the fulcrum shaft portion and the driver, and configured to move the driver unit toward the clincher unit for opening and closing;

wherein the magazine unit has:

a pusher provided to be movable along a length direction of the magazine, a pusher spring for pressing the pusher toward a magazine front wall part of the magazine, and a pusher band having one end portion attached to the pusher and the other end portion attached to the driver unit, and configured to connect the pusher and the driver unit, and wherein in a state where the pusher is retreated by the pusher band and is moved to a most retreat position in an operation of opening the handle unit and the driver unit with respect to the clincher unit and the magazine unit:

a length between an inner surface-side of the magazine front wall part and the pusher is 75 mm or longer, a length of the magazine is 90 mm or longer and 100 mm or shorter, a length of the pusher band is 51 mm or longer and 61 mm or shorter, a length from the fulcrum shaft portion to an attachment position of the pusher band to the driver unit is 41 mm or longer and 50 mm or shorter, and an entire length of the stapler is 105 mm or longer and 125 mm or shorter.

6. The stapler according to claim 5, further comprising:

a camshaft portion provided to any one of the clincher unit and the handle unit; and a cam groove portion provided to the other of the clincher unit and the handle unit, configured to permit the camshaft portion to enter, and having one open end portion in a direction, in which the clincher unit and the handle unit separate from each other, to enable the camshaft portion to be inserted/pulled out.

7. The stapler according to claim 5, wherein a ratio of the length of the magazine and the length of the pusher band is 10:5.7 to 6.1, and wherein a ratio of the length of the magazine and the length from the fulcrum shaft portion to the attachment position of the pusher band to the driver unit is 10:4.6 to 5.0.

* * * * *